US008608564B2

(12) United States Patent
Navid

(10) Patent No.: US 8,608,564 B2
(45) Date of Patent: Dec. 17, 2013

(54) CONNECTOR FOR VIDEO GAME CONTROLLER, AND VIDEO GAME CONTROLLER INCLUDING THE SAME

(75) Inventor: Amir Navid, Sherman Oaks, CA (US)

(73) Assignee: Nyko Technologies, Inc., Los Angeles, CA (US)

( * ) Notice: Subject to any disclaimer, the term of this patent is extended or adjusted under 35 U.S.C. 154(b) by 424 days.

(21) Appl. No.: 12/538,063

(22) Filed: Aug. 7, 2009

(65) Prior Publication Data

US 2010/0267454 A1   Oct. 21, 2010

Related U.S. Application Data

(60) Provisional application No. 61/171,424, filed on Apr. 21, 2009.

(51) Int. Cl.
*A63F 9/24* (2006.01)
*A63F 13/02* (2006.01)

(52) U.S. Cl.
USPC ............... 463/36; 463/45; 463/46; 463/47

(58) Field of Classification Search
USPC ............................... 463/36, 45–47
See application file for complete search history.

(56) References Cited

U.S. PATENT DOCUMENTS

| | | | |
|---|---|---|---|
| 6,203,344 B1 | 3/2001 | Ito | |
| 6,213,879 B1 | 4/2001 | Niizuma et al. | |
| 6,338,105 B1* | 1/2002 | Niizuma et al. | 710/72 |
| 6,703,962 B1 | 3/2004 | Marics et al. | |
| 2002/0098887 A1 | 7/2002 | Himoto et al. | |
| 2005/0269769 A1 | 12/2005 | Naghi et al. | |
| 2006/0158342 A1 | 7/2006 | Rogers | |
| 2007/0060391 A1* | 3/2007 | Ikeda et al. | 463/46 |
| 2007/0117625 A1 | 5/2007 | Marks et al. | |
| 2007/0117628 A1 | 5/2007 | Stanley | |
| 2007/0132733 A1 | 6/2007 | Ram | |
| 2007/0143801 A1 | 6/2007 | Madonna et al. | |
| 2008/0034129 A1 | 2/2008 | Lydon et al. | |

FOREIGN PATENT DOCUMENTS

WO   WO 02/34345 A2   5/2002

OTHER PUBLICATIONS

Search Report mailed Sep. 24, 2009 for corresponding International Patent Application No. PCT/US2009/053220.
Combined International Search Report and Written Opinion issued in corresponding International Patent Application No. PCT/US2009/053220 dated Sep. 24, 2009, 11 pages.
Pervasive Computing; Johnny Chung Lee, Carnegie Mellon University; *Hacking the Nintendo Wii Remote*; Published by the IEEE CS 1536-1268/08 © IEEE; pp. 39-45.

* cited by examiner

*Primary Examiner* — Werner Garner
(74) *Attorney, Agent, or Firm* — Christie, Parker & Hale, LLP

(57) ABSTRACT

A connector for a video game controller including electrical circuitry and a plurality of buttons. The connector includes: a plurality of contacts for receiving and transmitting electrical signals; and a plurality of pins electrically coupled to the plurality of contacts for communicating the electrical signals with the electrical circuitry of the video game controller. The plurality of contacts includes at least one contact for receiving an electrical signal that corresponds to pressing one of the plurality of buttons from among the plurality of electrical signals.

9 Claims, 23 Drawing Sheets

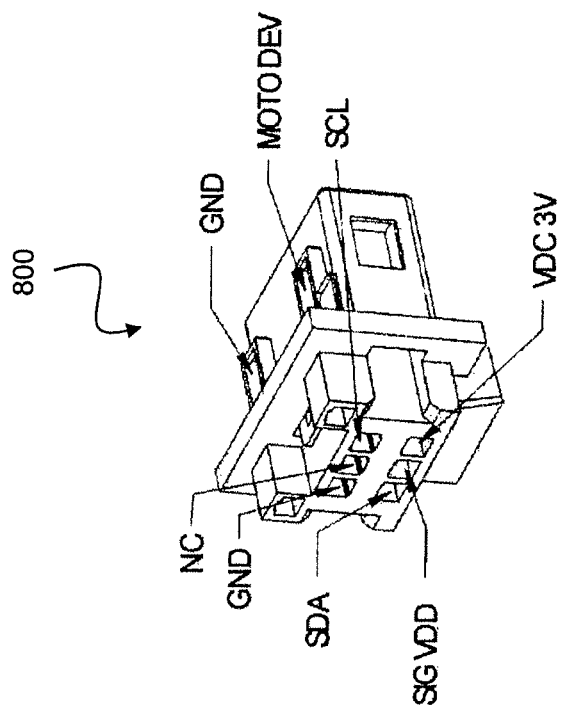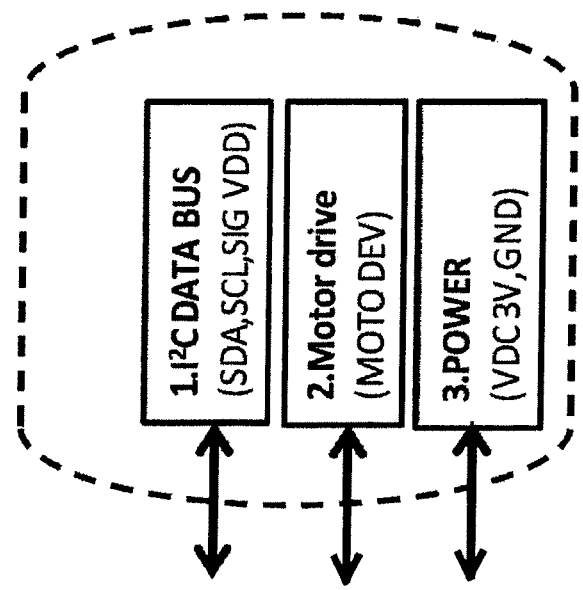
FIG. 23

CONNECTOR FOR VIDEO GAME CONTROLLER, AND VIDEO GAME CONTROLLER INCLUDING THE SAME

CROSS-REFERENCE TO RELATED APPLICATION(S)

This application claims priority to and the benefit of U.S. Provisional Application No. 61/171,424, entitled "Connector for Video Game Controller, and Video Game Controller Including the Same," filed Apr. 21, 2009, the entire content of which is incorporated by reference herein.

BACKGROUND

A video game is often played with the help of a video game controller, which usually has a variety of mechanical keys or buttons to command different functions. When a video game controller is operated together with a video game accessory, such as a pistol grip (e.g., gun controller), a moving part of the pistol grip or the like generally physically engages and mechanically moves (e.g., presses) the keys/buttons on the video game controller to command various functions. Such mechanical moving parts on the video game controller can be broken or can wear down over the course of playing video games when using such a video game accessory. By way of example, when a video game controller is used together with a pistol grip, when a trigger on the pistol grip is pulled, a component of the pistol grip is physically moved to mechanically press a button on the video game controller so as to command functions. The video game controller buttons can be damaged through repeated mechanical pressing with hard moving parts of the video game accessory.

SUMMARY OF THE INVENTION

In embodiments according to the present invention, electronic signals outputted from/inputted into the video game controller replace the physical movement of mechanical components on a video game accessory that interfaces with the video game controller. This way, mechanical pressing of buttons/keys or switches on the video game controller can be reduced or eliminated. For example, a video game accessory may have buttons/keys, switches or other mechanical, electromechanical or electrical components for duplication of functions of the buttons/keys or switches on a video game controller. The above components of the video game accessory generate electrical and/or digital signals and send the generated signals to the video game controller rather than mechanically pressing or moving buttons/keys or switches on the video game controller.

In other embodiments according to the present invention, the feature/function of generating/triggering electrical and/or digital signals for duplicating functions of buttons/keys or switches of a video game controller can be assigned by a user to different buttons/keys, switches or other components on a video game accessory. By way of example, a user can assign trigger functions to the buttons or switches on a video game accessory (e.g., a gun grip) to customize how electrical and/or digital signals are triggered from the accessory. The video game accessory may include mechanical, electromechanical or electrical switches that can be used by a user for such customization of signal generation/triggering functions.

In one exemplary embodiment according to the present invention, a connector for a video game controller including electrical circuitry and a plurality of buttons, is provided. The connector includes: a plurality of contacts for receiving and transmitting electrical signals; and a plurality of pins electrically coupled to the plurality of contacts for communicating the electrical signals with the electrical circuitry of the video game controller. The plurality of contacts includes at least one contact for receiving an electrical signal that corresponds to pressing one of the plurality of buttons from among the plurality of electrical signals.

The plurality of electrical signals may include at least one of power, ground, a motor drive signal, an analog or digital directional movement signal, various button press signals, a data signal or audio signal.

The connector may further include a case having a cavity and a contact mount in the cavity, wherein the plurality of contacts includes primary contacts on the contact mount.

The connector may further include a protruding member attached to the case and the plurality of contacts may include secondary contacts on the protruding member.

At least one of the secondary contacts may be configured to receive a button press signal.

An insulation may be on one of inner surfaces of the case, and the plurality of contacts may include additional contacts on the insulation.

At least one of the additional contacts may be configured to receive a motor drive signal to initiate vibration.

Another exemplary embodiment according to the present invention provides a mating connector for mating with the above-referenced connector.

Another exemplary embodiment according to the present invention provides a video game accessory including the above-referenced mating connector.

Another exemplary embodiment according to the present invention provides an auxiliary video game controller including the above-referenced mating connector.

The auxiliary video game controller may be configured to interface with the video game controller via an Inter-Integrated Circuit (I²C) data bus interface.

Another exemplary embodiment according to the present invention provides a video game controller including electrical circuitry, a plurality of buttons, and a connector. The connector includes: a plurality of contacts for receiving and transmitting electrical signals; and a plurality of pins electrically coupled to the plurality of contacts for communicating the electrical signals with the electrical circuitry. The plurality of contacts includes at least one contact for receiving an electrical signal that corresponds to pressing one of the plurality of buttons from among the plurality of electrical signals.

Yet another exemplary embodiment according to the present invention provides a video game accessory that includes a mating connector for mating with a connector for a video game controller including electrical circuitry and a plurality of buttons. The connector for the video game controller includes: a plurality of contacts for receiving and transmitting electrical signals; and a plurality of pins electrically coupled to the plurality of contacts for communicating the electrical signals with the electrical circuitry of the video game controller. The plurality of contacts includes at least one contact for receiving an electrical signal that corresponds to pressing one of the plurality of buttons from among the plurality of electrical signals.

The video game accessory may further include means for duplicating a function of the one of the plurality of buttons and providing the electrical signal that corresponds to pressing the one of the plurality of buttons to the video game controller.

The video game accessory may further include a controller mount configured to support the video game controller.

The video game accessory may further include a holding member to secure the video game controller when the video game controller is supported by the controller mount.

The video game accessory may further include a grip and a trigger.

The video game accessory may further include a key pad including a plurality of keys.

The plurality of keys may include alphanumeric keys.

The video game accessory may further include: a button on the video game accessory; and means for assigning the electrical signal that corresponds to pressing the one of the plurality of buttons to the button on the video game accessory.

BRIEF DESCRIPTION OF THE DRAWINGS

FIG. 23 is a perspective view and signal description of a male connector (or male plug) of an auxiliary video game controller according to another embodiment of the present invention.

DETAILED DESCRIPTION

In exemplary embodiments according to the present invention, a connector system for video game controllers and/or video game accessories is provided. The connector system includes a female connector and a male connector. The female connector includes a plurality of contacts (or contact plates) for transmitting and/or receiving signals. The male connector for mating with the female connector includes a plurality of contacts (or contact plates) for contacting the contacts (or contact plates) of the female connector to transmit and/or receive the signals.

The signals include one or more of analog or digital directional movement signals, various key/button press signals, power, ground, or motor drive signals (e.g., vibration signals), data or audio signals, etc. The connector system may also include a serial port interface between the female and male connectors. By way of example, by providing (e.g., simulating or replicating) key/button press signals from a video game accessory, key or button pressing of a video game controller can be commanded in the video game controller without actually pressing a key or a button on the video game controller. Similarly, motor drive signals (e.g., vibration signals), directional movement signals, etc. can also be provided to the video game controller and/or the auxiliary video game controller by a video game accessory. By providing control signals (e.g., button press signals) to the video game controller, a need for pressing buttons mechanically on the video game controller may be reduced or eliminated. For example, a video game accessory may have buttons/keys, switches or other mechanical, electromechanical or electrical components for duplication of functions of the buttons/keys or switches on a video game controller. The above components of the video game accessory generate electrical and/or digital signals and send the generated signals to the video game controller rather than mechanically pressing or moving buttons/keys or switches on the video game controller. The video game accessories may include a pistol grip, type pad (e.g., keyboard), steering wheel, arcade stick, various sporting instruments such as baseball bats, golf clubs, etc., swords and other fighting accessories and/or the like.

The video game controllers may include a WAND™ controller for a Wii® video game console available from Nintendo®, but are not limited thereto. The WAND™ controller is available from Nyko® Technologies, Inc. The auxiliary video game controllers may include a KAMA™ controller for the Wii® video game console, available from Nyko® Technologies, Inc., but are not limited thereto. The video game controllers and auxiliary video game controllers in other embodiments may operate with other video game consoles, such as, for example, Xbox® 360 available from Microsoft® or PS3® available from SONY®, and/or other next generation consoles.

Figure 1:
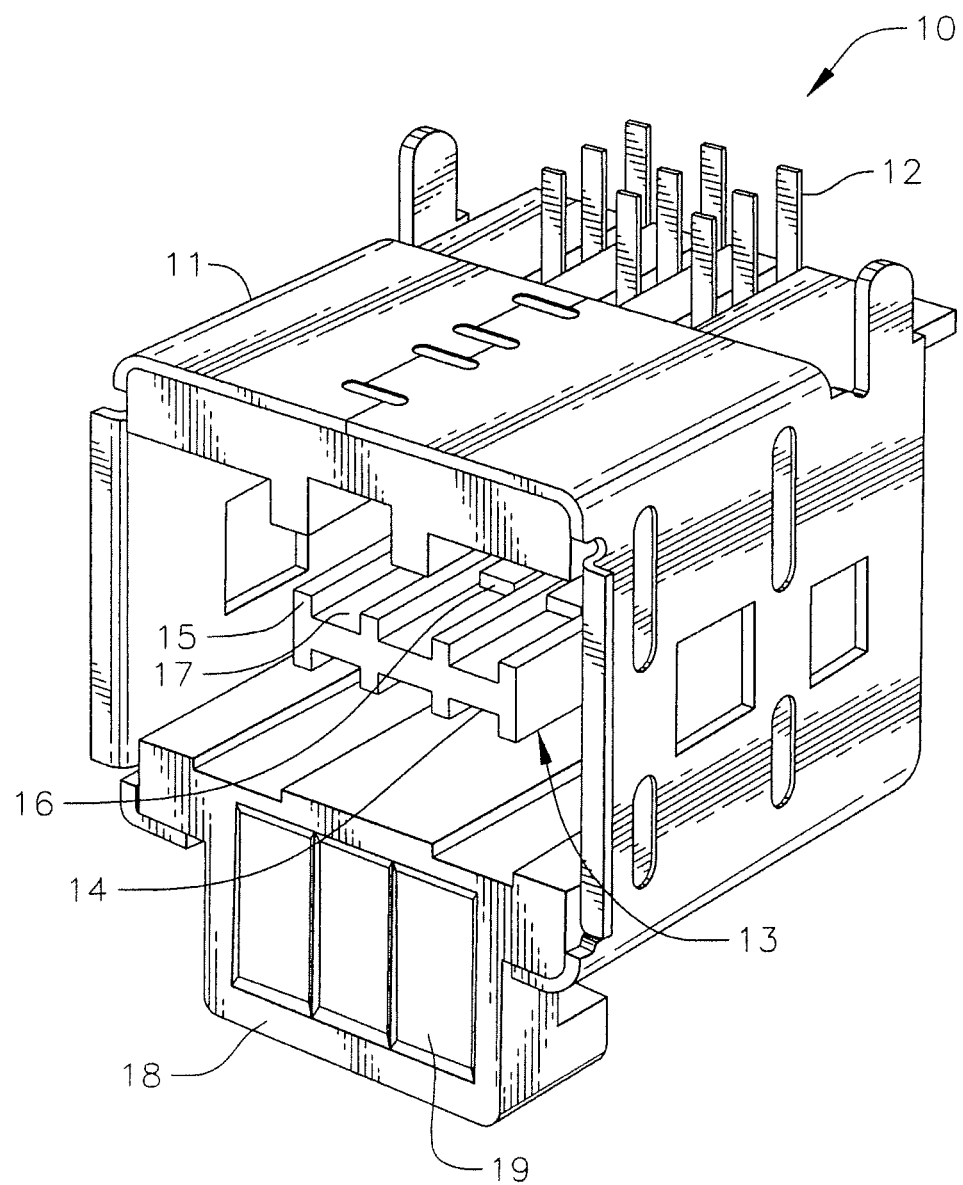
FIG. 1 is a front perspective view of a female connector for a video game controller according to an embodiment of the present invention.

FIG. 1 is a front perspective view of a female connector 10 for a video game controller according to an embodiment of the present invention. The female connector 10 includes a generally cubical case 11 and a plurality of pins 12 protruding from a top side of the case 11 for electrically connecting electrical contacts of the female connector 10 with electrical circuitry (i.e., electronic circuitry) of a host device (e.g., video game controller, auxiliary video game controller or a video game accessory).

The electrical circuitry may include one or more of a motor for generating vibrations or rumble, a microprocessor or microcontroller for controlling operations of the host device including user interface such as converting button press to electrical signals and light indications, a speaker, a microphone, logic circuitry, communication (e.g., wireless communication) circuitry, motion/orientation sensors, memory and/or the like, as those skilled in the art would appreciate. In FIG. 1, the female connector 10 includes nine pins that are arranged in a 3×3 matrix, but the present invention is not limited thereto. The pins may be formed of suitable conductive metal, for example, copper, aluminum or the like. The case 11 may be formed of metal such as copper, aluminum, stainless steel or the like. The case includes an insulating material such as plastic, covering at least a portion of its inner surfaces or outer surfaces to prevent shorts.

The female connector 10 also includes a contact mount 13 in a cavity defined in the case 11, and having a base 14 and a plurality of ribs 15 protruding from the base 14. The base 14 has a substantially flat rectangular shape. The ribs 15 extend parallel to each other, and protrude from both surfaces of the base 14 so as to form a plurality of parallel channels 17 having a same size at both above and below the base 14. In one exemplary embodiment of FIG. 1, the base 14 has four ribs 15 (two ribs on respective edges of the base 14 and two ribs between the edge ribs) located thereon to define three channels on each side of the base 14 (for a total of six channels). The contact mount including the base 14 and the ribs 15 may be made of plastic or other insulating material, and may be formed as a single integrated piece.

The contact mount 13 has located thereon a plurality of primary contacts (or contact plates) 16 that are electrically coupled to the respective pins 12. Because there are six channels 17 in the embodiment illustrated in FIG. 1 (three on either surface of the base 14), the contact mount 13 can support up to six primary contacts 16. Only two of the primary contacts 16 are shown in FIG. 1 as locations corresponding to four of the primary contacts are hidden from view by other components of the female connector 10. The primary contacts 16 may be formed of suitable conductive metal, such as copper, aluminum or the like.

The female connector 10 also includes a protruding member 18 having a generally rectangular shape and a plurality of secondary contacts (or contact plates) 19 located thereon. The secondary contacts 19 are also electrically connected with the respective pins 12. In one embodiment, when the female connector 10 is used in a video game controller, the primary contacts 16 are used to communicate via the respective pins 12 with an auxiliary video game controller or a video game accessory to transmit/receive such signals as directional movement signals, power, ground and the like. The secondary contacts 19 may be used to communicate via the respective pins 12 with the auxiliary video game controller or the video game accessory to receive key/button press signals, data, serial data, motor drive signals (e.g., vibration signals) and/or the like. The secondary contacts 19 may be formed of suitable conductive metal, such as copper, aluminum or the like.

While the female connector 10 according to one exemplary embodiment illustrated in FIG. 1 has been described above, the present invention is not limited thereto. For example, the shape of the case, the shape and location of the contact mount, the number of primary contacts and secondary contacts, the number of pins, the functions of each of the contacts and pins, can all be different in other embodiments as those skilled in the art would appreciate. In these other embodiments, the contacts and pins are also used to communicate control and data signals such as analog or digital directional movement signals, motor drive signals, serial data signals, key/button press signals, data or audio signals, and/or power and ground.

Further, in the female connector 10 and other connectors (e.g., other female and male connectors), primary and secondary contacts (e.g., contacts 16 or 19) are used for making electrical contacts for various different signals. These contact plates for electrical connection help to realize a modularized architecture in which physical contacts between contact plates of interfacing/engaging/mating connectors form an electrical connection. In embodiments of the present invention, such contact plates are used in both male and female connectors to form one or more electrical connections therebetween.

Figure 2:
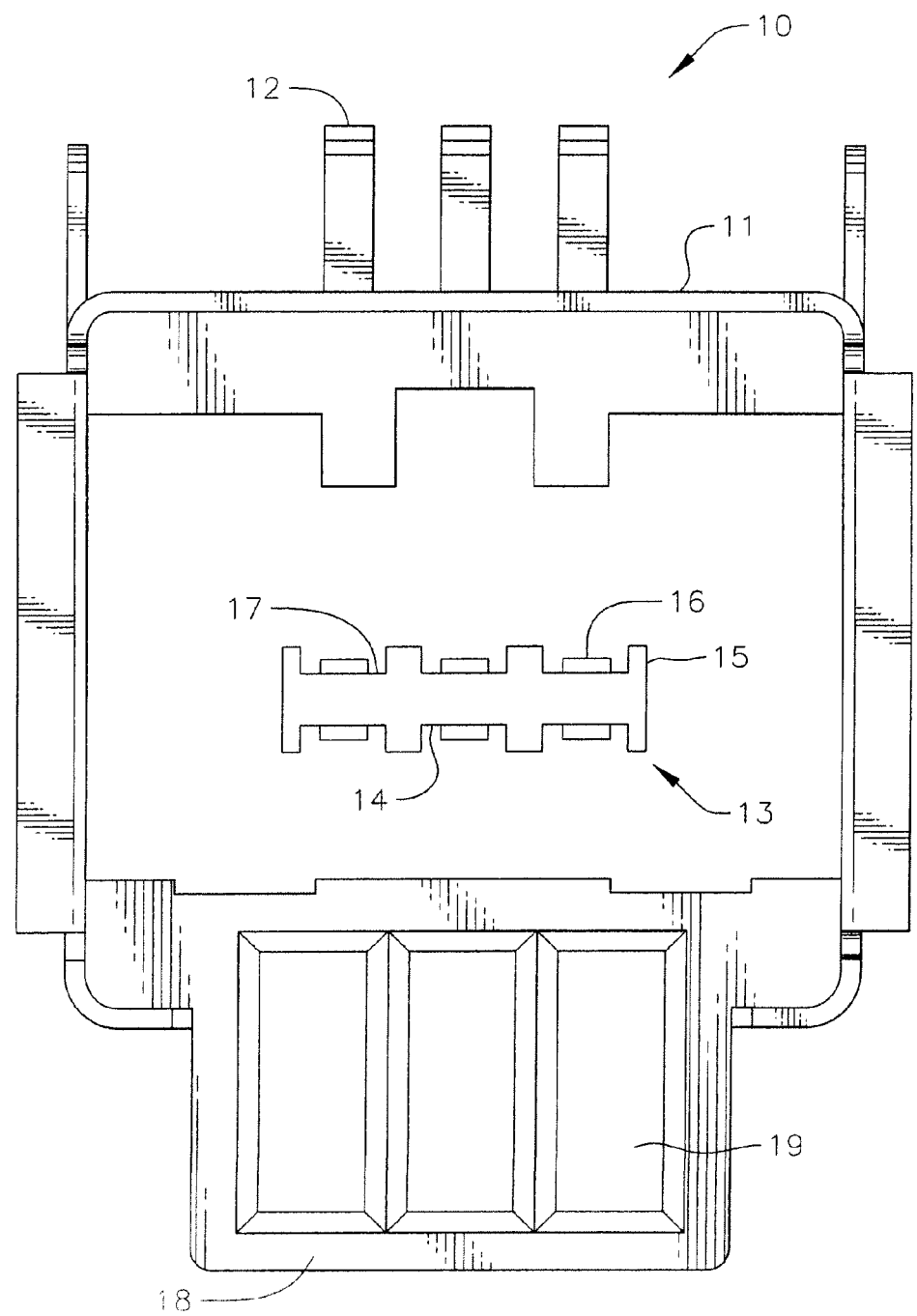
FIG. 2 is a front view of the female connector of FIG. 1.
Figure 3:
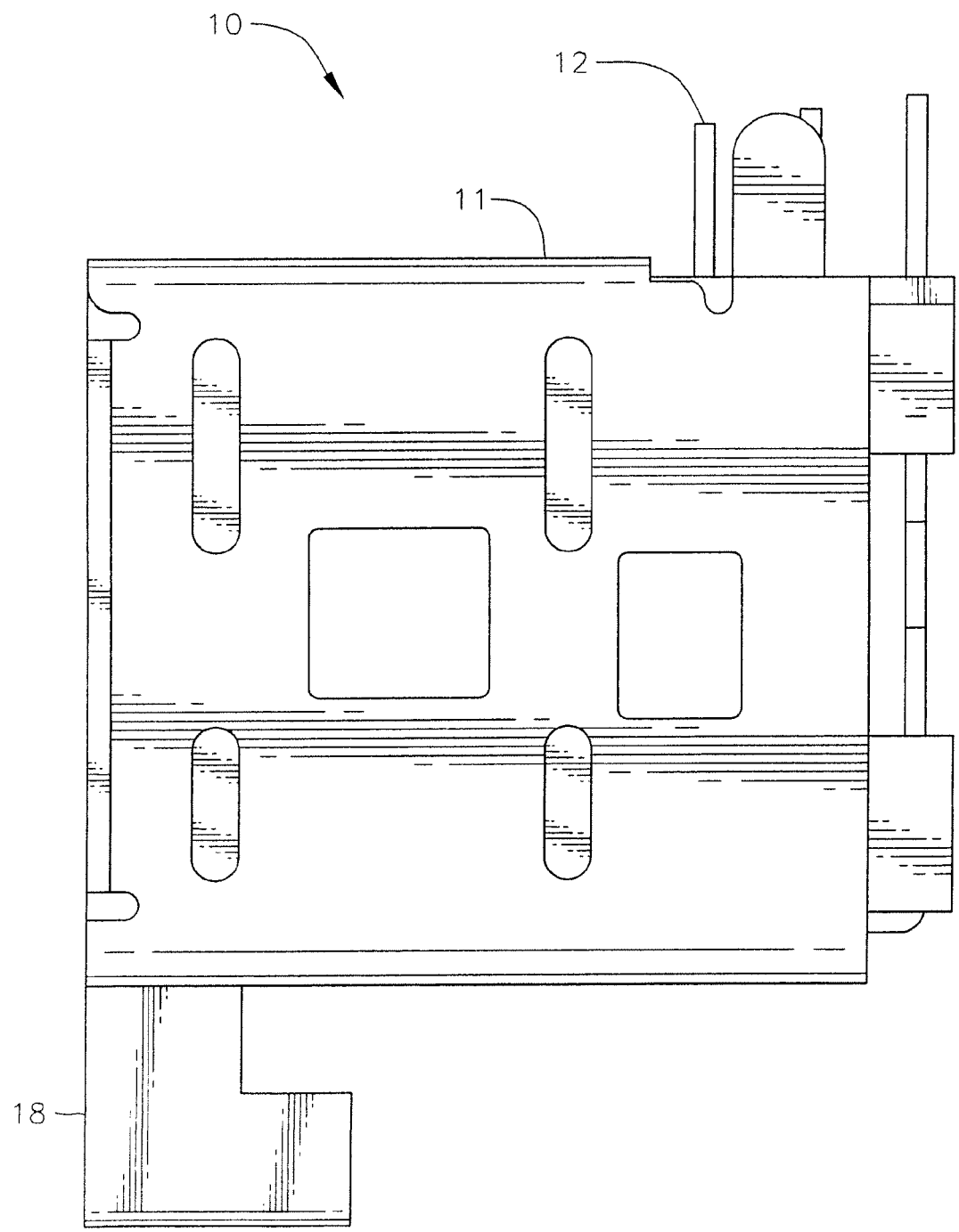
FIG. 3 is a side view of the female connector of FIG. 1.
Figure 4:
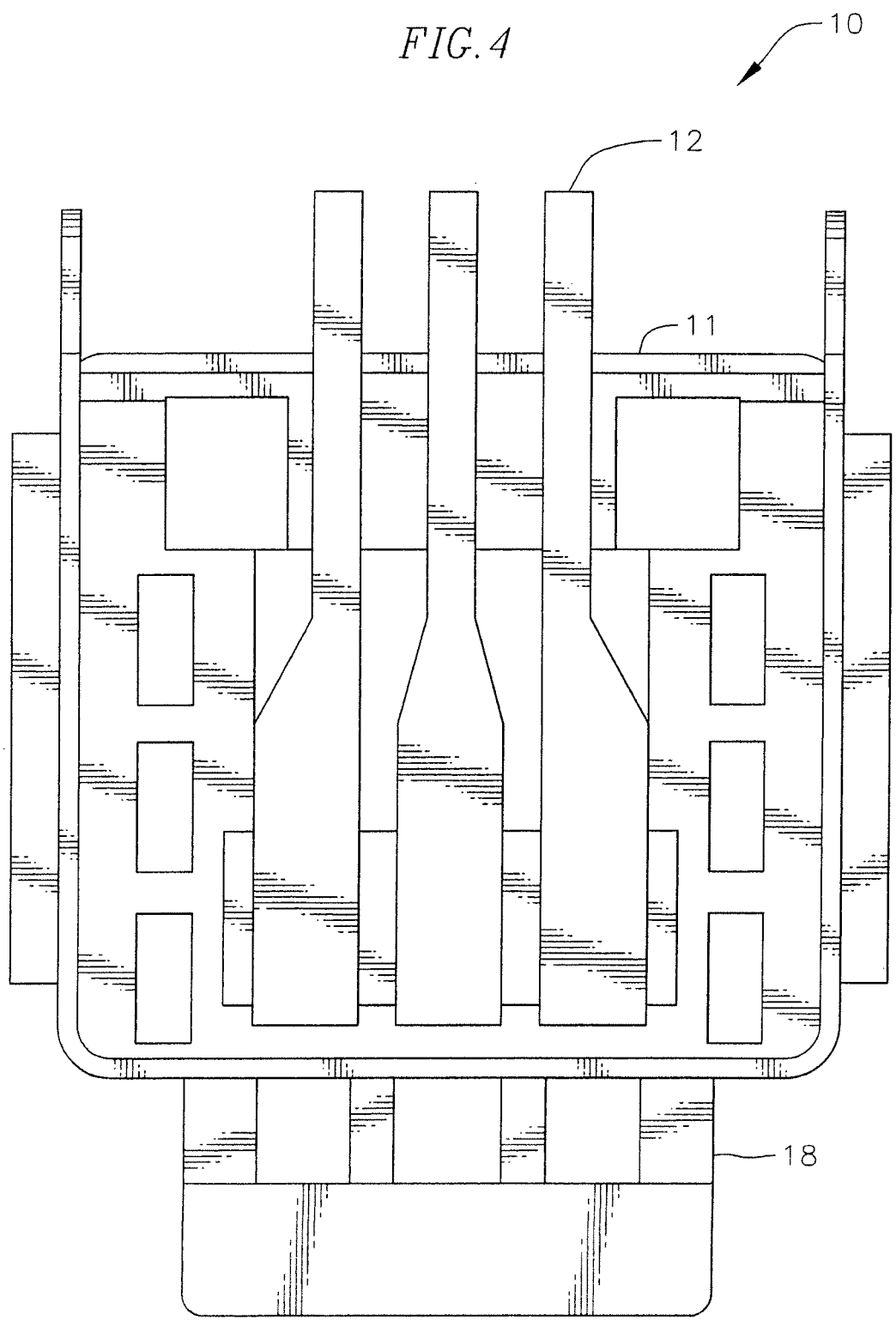
FIG. 4 is a rear view of the female connector of FIG. 1.
Figure 5:
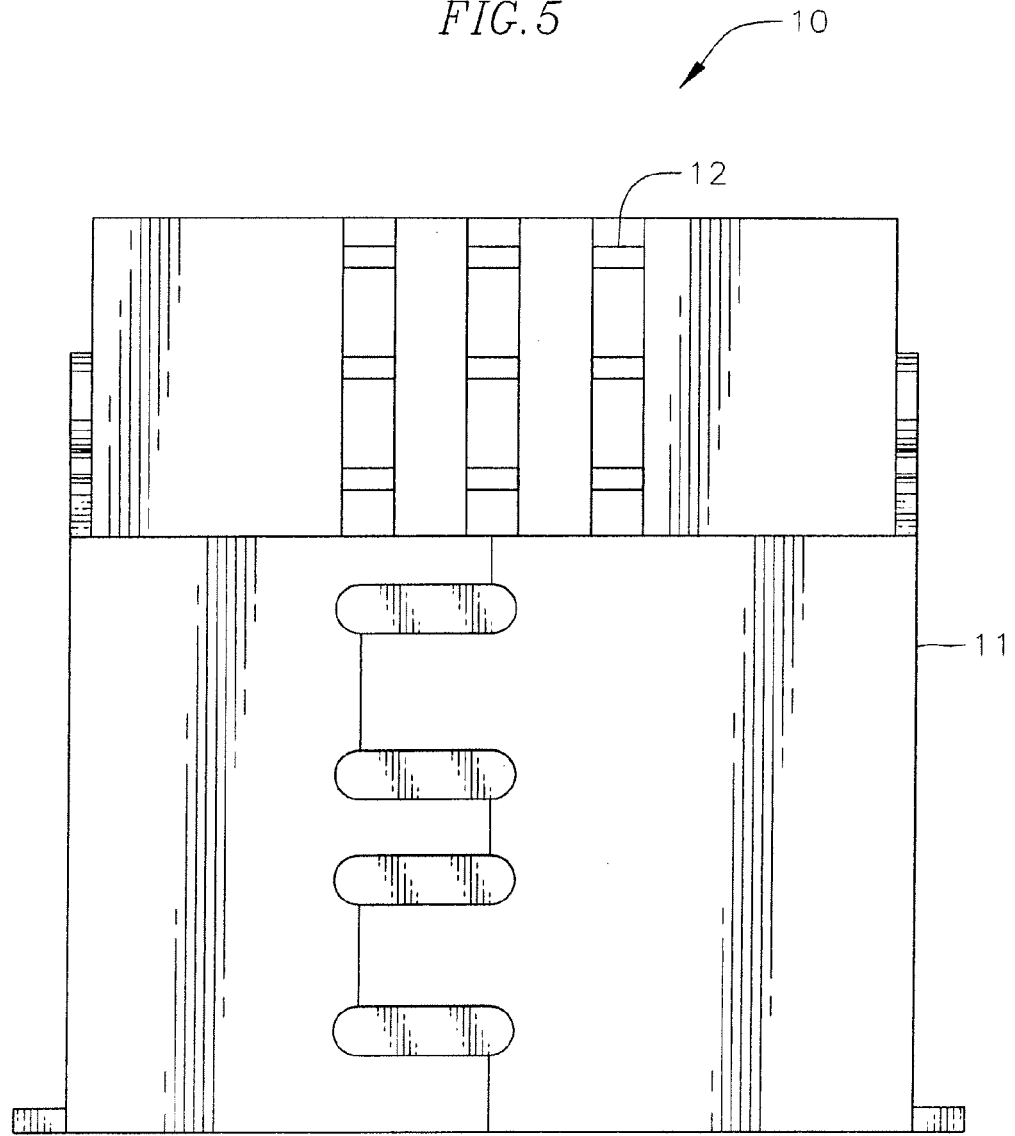
FIG. 5 is a top view of the female connector of FIG. 1.
Figure 6:
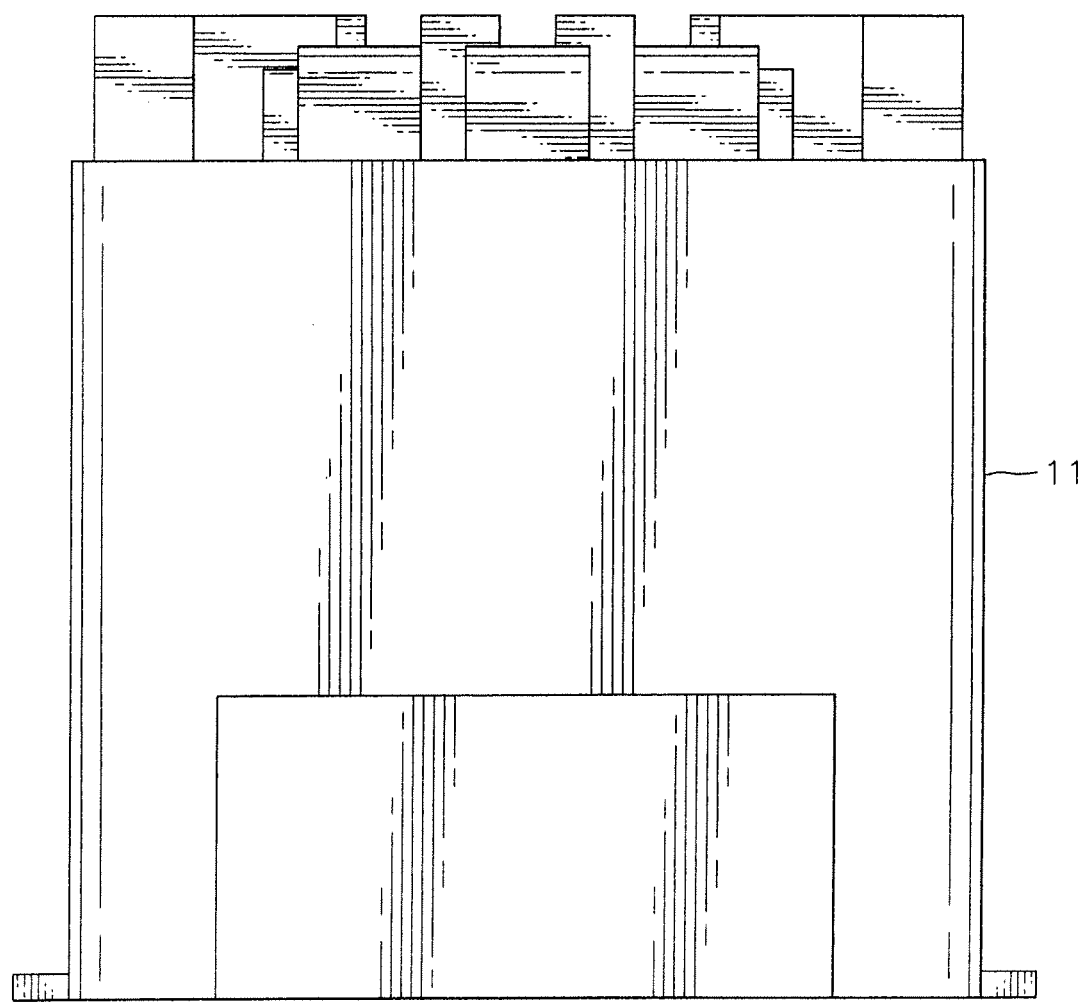
FIG. 6 is a bottom view of the female connector of FIG. 1.

FIG. 2 is a front view of the female connector 10 of FIG. 1. All six of the primary contacts 16 mounted on the contact mount 13 are shown in FIG. 2. FIGS. 3, 4, 5 and 6 are a side view, a rear view, a top view and a bottom view, respectively, of the female connector 10 of FIG. 1.

Figure 7:
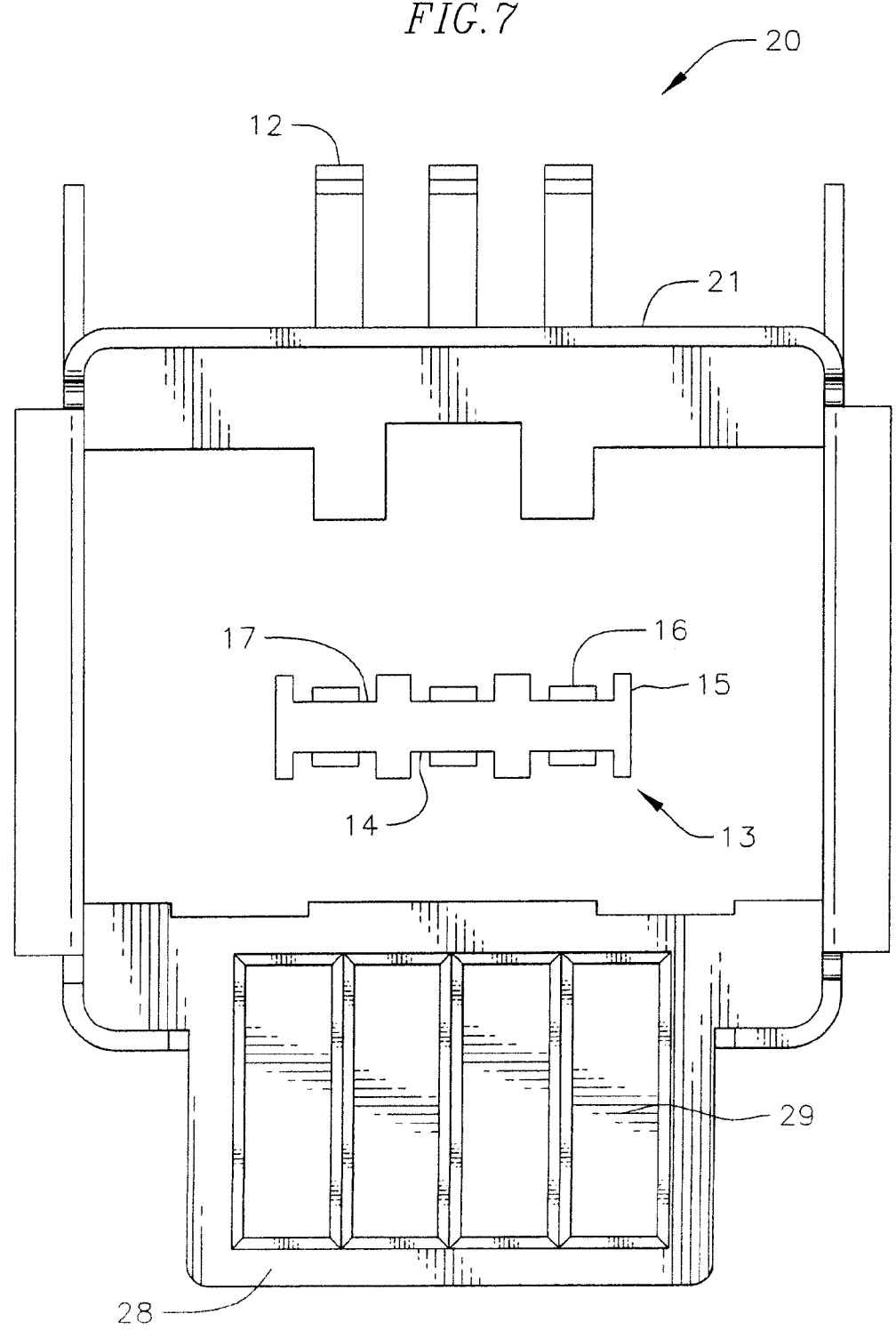
FIG. 7 is a front view of a female connector for a video game controller according to another embodiment of the present invention.

FIG. 7 is a front view of a female connector 20 for a video game controller according to another embodiment of the present invention. The female connector 20 is substantially the same as the female connector 10 of FIG. 1, except that the female connector 20 includes a protruding member 28 on which four secondary contacts (or contact plates) 29 are located, on a case 21. Those skilled in the art would appreciate that the number of pins 12 may be different to account for an additional electrical connection from the secondary contacts 29. Also, those skilled in the art would appreciate that the control and data signals and power and ground carried by the pins 12 and the primary and secondary contacts 16, 29 can include substantially the same signals, power and ground as those carried by the pins 12 and the primary and secondary contacts 16, 19 of the female connector 10 in FIG. 1. The primary and secondary contacts 16, 29 may be formed of suitable conductive metal, such as copper, aluminum or the like.

Figure 8:
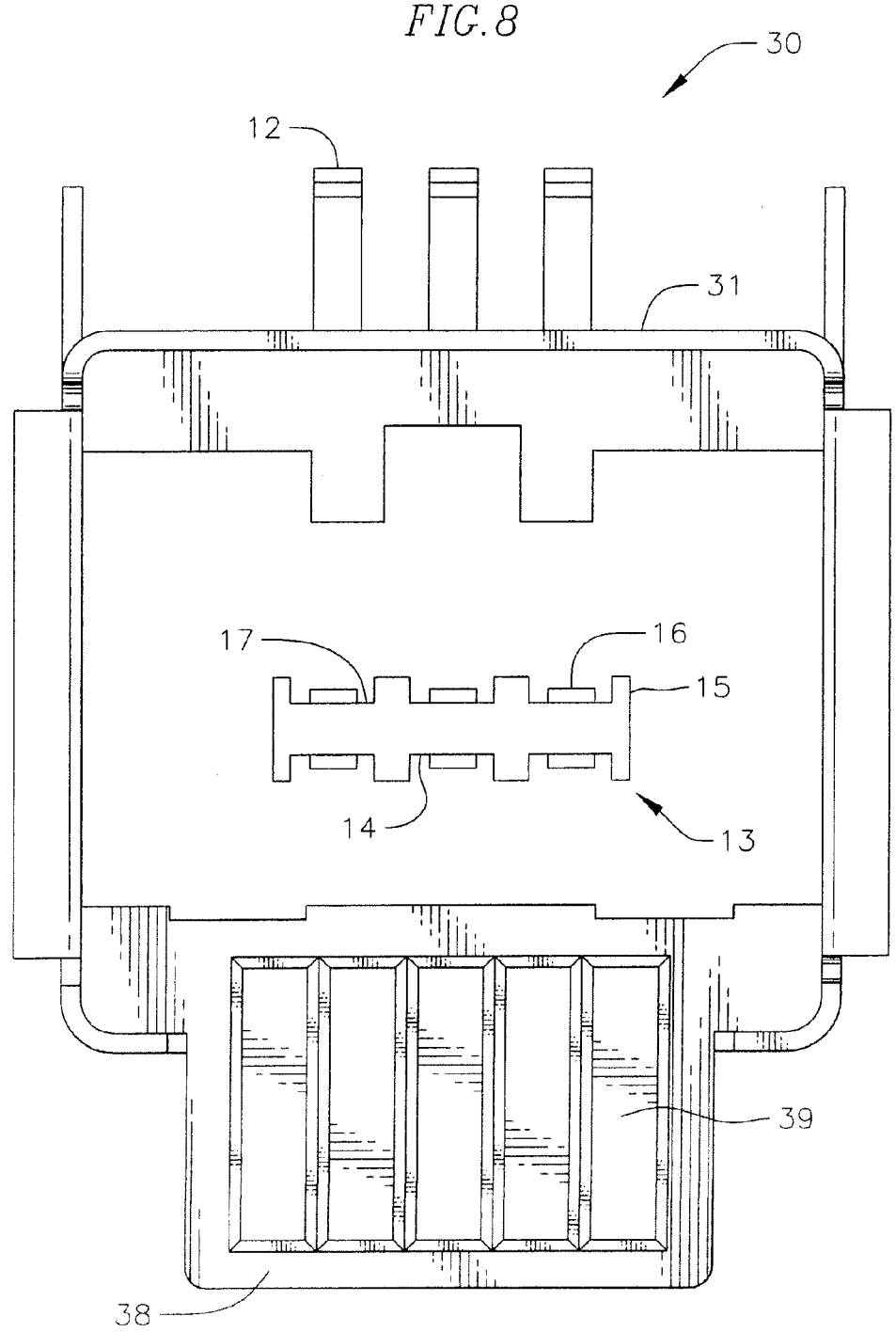
FIG. 8 is a front view of a female connector for a video game controller according to another embodiment of the present invention.

FIG. 8 is a front view of a female connector 30 for a video game controller according to another embodiment of the present invention. The female connector 30 is substantially the same as the female connector 10 of FIG. 1, except that the female connector 30 includes a protruding member 38 on which five secondary contacts (or contact plates) 39 are located, on a case 31. Those skilled in the art would appreciate that the number of pins 12 may be different to account for additional electrical connections from the secondary contacts 39. Also, those skilled in the art would appreciate that the control and data signals and power and ground carried by the pins 12 and the primary and secondary contacts 16, 39 can include substantially the same signals, power and ground as those carried by the pins 12 and the primary and secondary contacts 16, 19 of the female connector 10 in FIG. 1. The primary and secondary contacts 16, 39 may be formed of suitable conductive metal, such as copper, aluminum or the like.

Figure 9:
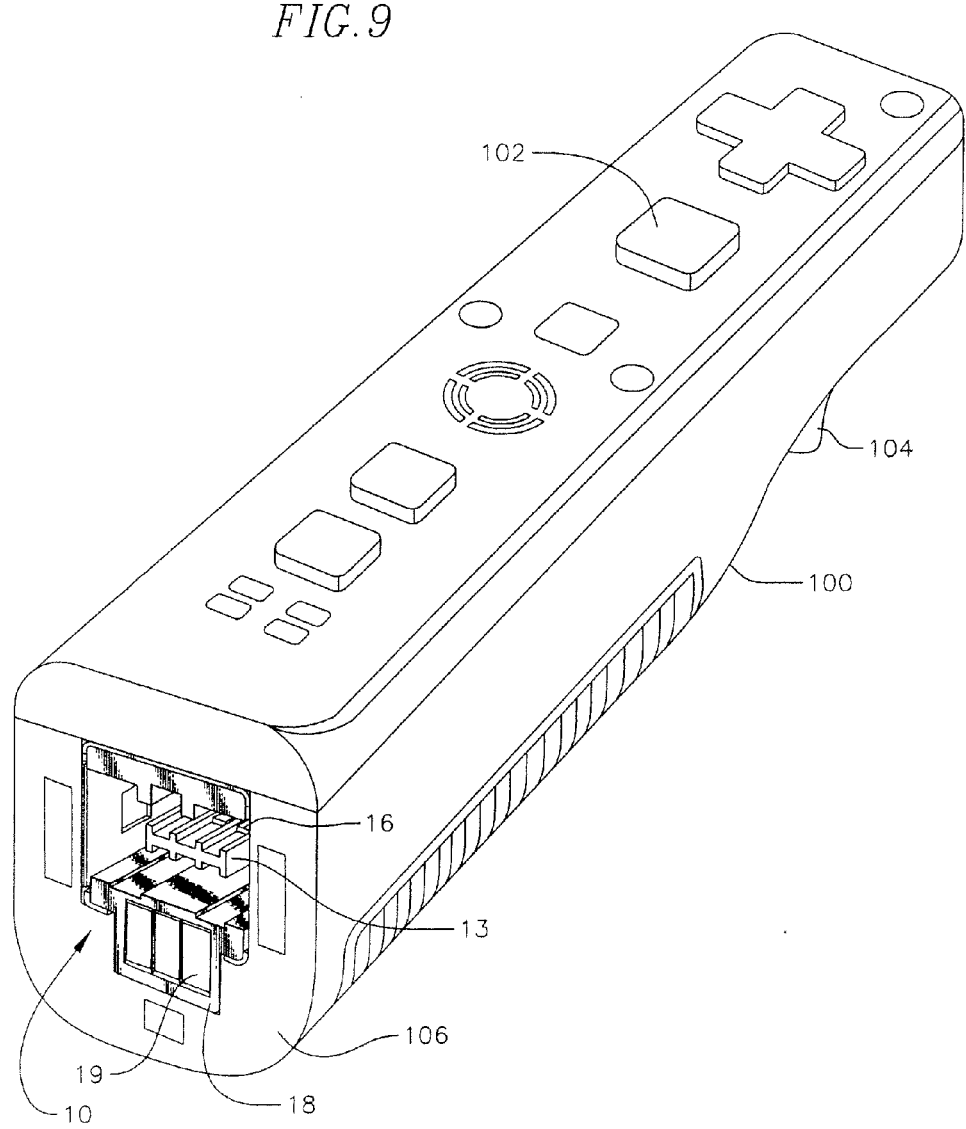
FIG. 9 is a perspective view of a video game controller including the female connector of FIG. 1.
Figure 10:
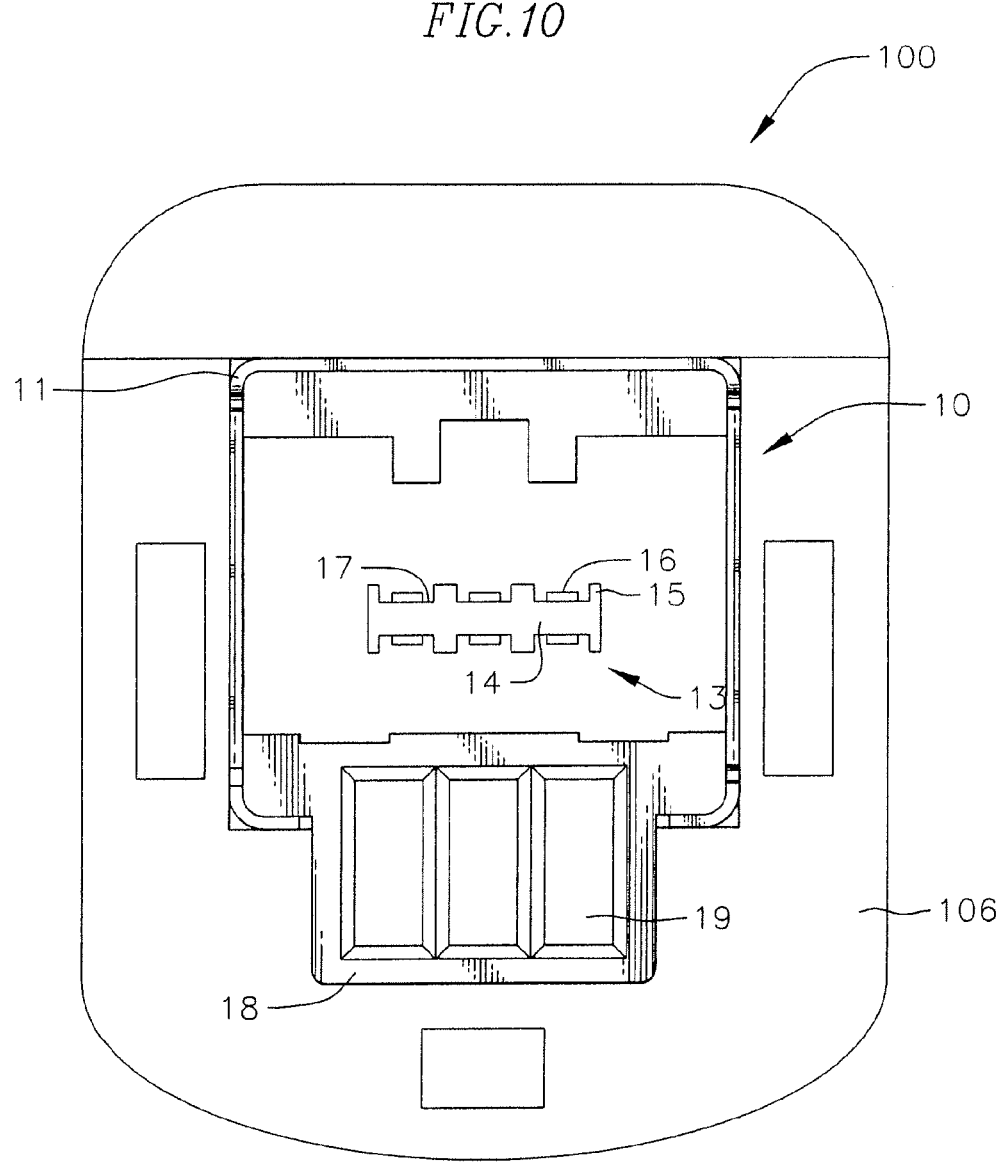
FIG. 10 is a bottom view of the video game controller of FIG. 9, showing the female connector.

FIG. 9 is a perspective view of a video game controller 100 including the female connector 10 of FIG. 1. FIG. 10 is a bottom view of the video game controller of FIG. 9, showing the female connector 10 included in the video game controller 100. The video game controller 100 may be any suitable video game controller that can interface with an auxiliary video game controller and/or a video game accessory. By way of example, the video game controller can be a WAND™ controller available from Nyko Technologies, Inc., but the present invention is not limited thereto.

For example, the control and data signals and power provided to the video game controller 100 can include analog or digital directional movement signals, motor drive signals (e.g., vibration signals), key/various button press signals, serial data signals, audio signals, power, ground and/or the like. In one embodiment, when corresponding key/button signal or signals are received through one or more secondary contacts 19, the video game controller 100 may be commanded as though corresponding one or more keys or buttons have been pressed. In other words, for example, when receiving a signal corresponding to "button 'A' press" through the secondary contacts 19, the video game controller 100 will send signals to the video game console corresponding to pressing of a button A 102. Further, when receiving a signal corresponding to "button 'B' press", through the secondary contacts 19, the video game controller 100 will send signals to the video game console corresponding to pressing of a button B 104.

The video game controller 100 illustrated in FIG. 9 is a wireless video game controller that can be coupled to the video game console remotely without a wire. However, the present invention is not limited thereto, and the video game controller 100 may be a wired video game controller. Also, while the video game controller 100 can be physically and electrically coupled to an auxiliary video game controller or a video game accessory, the video game controller 100 can alternatively be physically and electrically connected to a dongle (i.e., wireless adapter) that is remotely coupled to an auxiliary video game controller or a video game accessory in a wireless manner.

While the video game controller 100 in FIGS. 9 and 10 includes the female connector 10 of FIGS. 1-6, the video game controller in other embodiments may alternatively include the female connector 20 of FIG. 7, the female connector 30 of FIG. 8 or a female connector 10' of FIG. 17 described below. Alternatively, the video game controller in other embodiments may include a male connector that is a mating connector to one of the female connectors 10, 20, 30 or 10', which male connector is to be described below. In still other embodiments, the video game controller may use a female or male connector that has different shapes and/or different number of pins and contacts without departing from the spirit or scope of the present invention.

Figure 11:
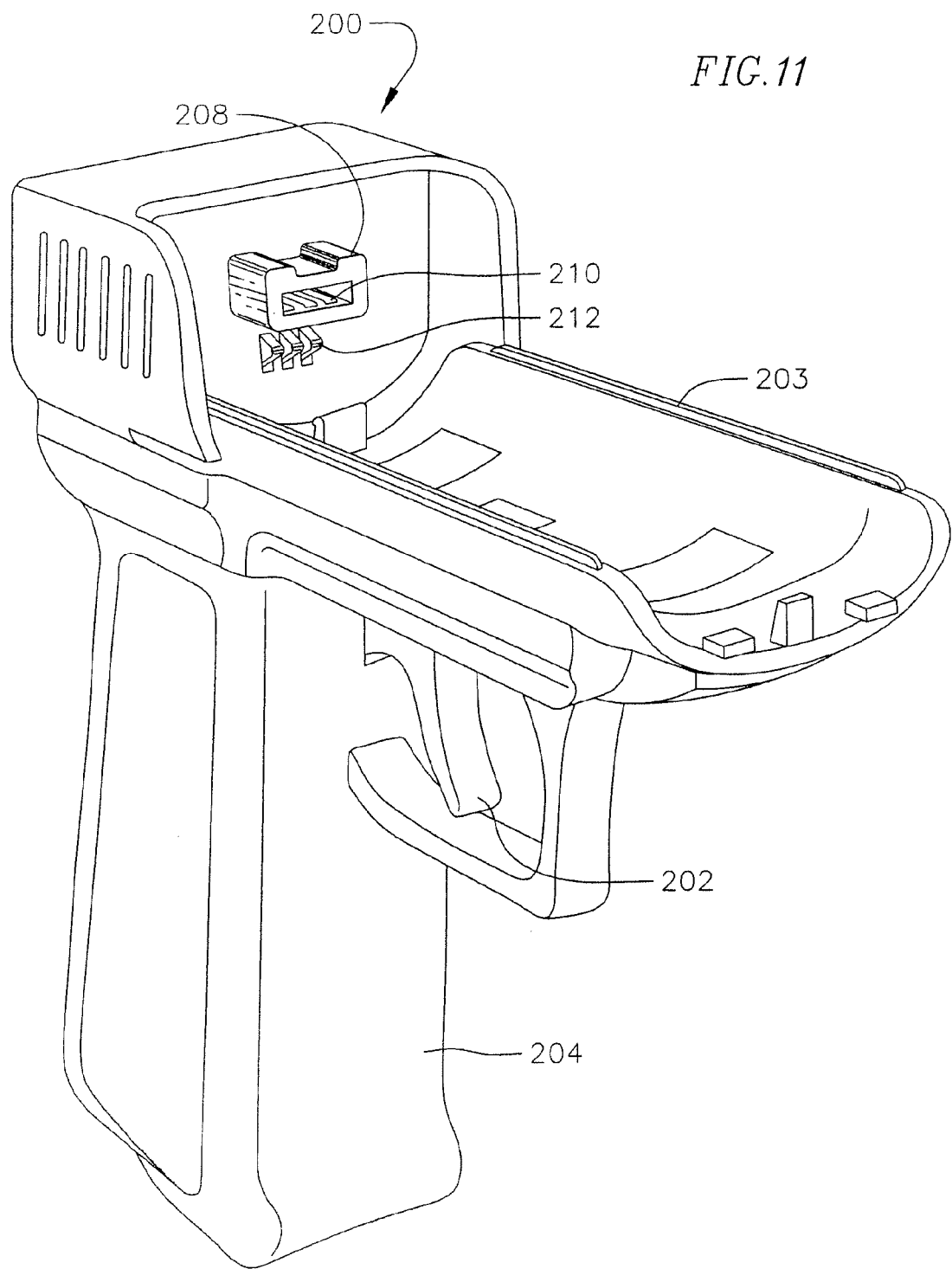
FIG. 11 is a front perspective view of a video game accessory (or video game controller accessory) including a male connector for mating with the female connector on the video game controller of FIG. 9.
Figure 12:
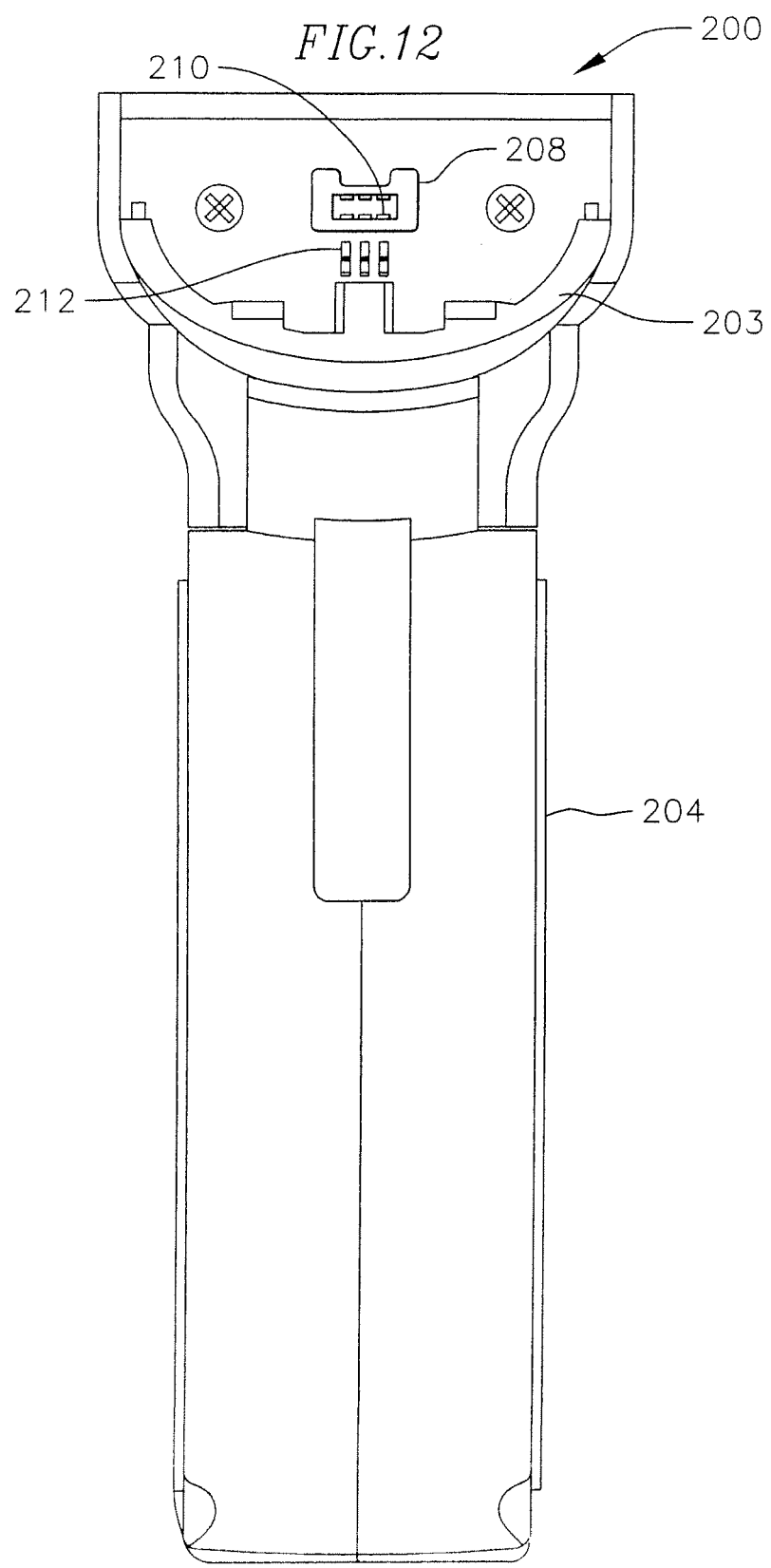
FIG. 12 is a front view of the video game accessory of FIG. 11.

FIG. 11 is a front perspective view of a video game accessory (or video game controller accessory) 200 including a male connector 208 for mating with the female connector 10 on the video game controller 100 of FIG. 9. FIG. 12 is a front view of the video game accessory 200 of FIG. 11. The video game accessory 200 of FIGS. 11-12 is a pistol grip (a gun controller) for mounting the video game controller 100 thereon. The video game accessory 200 includes a grip 204, a trigger 202 and a controller mount 203. The controller mount 203 is configured to support the video game controller 100, and the grip 204 is configured for a user to grab onto while playing a shooting game, for example. The trigger 202 is configured to be pulled by a user to give a shooting command control signal to the video game controller 100. By way of example, in one embodiment, when the trigger 202 is pulled, the video game accessory 200 sends a control signal corresponding to pressing of the 'B' button 104 on the video game controller 100, to the video game controller 100.

The video game accessory 200 also includes a male connector 208 for physically and electrically coupling to the female connector 10 of the video game controller 100. The male connector 208 has formed thereon a plurality of primary contacts (or contact plates) 210 for electrically coupling with the primary contacts 16 of the female connector 10. In one embodiment, three primary contacts 210 are formed at each of both top and bottom inner surfaces of the male connector 208 to electrically couple with the six primary contacts 16 of the female connector 10.

The male connector 208 also includes a plurality of secondary electrical contacts 212. The electrical contacts 212 are spring loaded to press on the secondary contacts 19 of the female connector 10 for sufficient electrical connection. In one embodiment, the male connector 208 includes three secondary contacts 212 to electrically couple with the three secondary contacts 19 in the video game controller 100 of FIG. 9. In other embodiments, the number of primary and/or secondary contacts may be different to electrically contact the primary and secondary contacts 16, 19 of FIG. 9. The primary and secondary contacts 210, 212 may be formed of suitable conductive metal, such as copper, aluminum or the like.

In operation, for example, the primary contacts 210 may receive power, ground and other signals from the video game controller 100 through the primary contacts 16. The secondary contacts 212 are used to transmit control signals to the video game controller 100. For example, the control signals may include one or more of key/button press signals, motor drive signals, data signals, and/or the like. For instance, when the key/button press signals are provided to the video game controller 100, the video game controller 100 may perceive them as a pressing of a corresponding key/button on the video game controller 100. While the video game accessory 200 includes only six primary contacts 210 and the three secondary contacts 212, in other embodiments, the number of primary and/or secondary contacts may be different to correspond to the number of primary/secondary contacts in the corresponding female connector.

In the embodiment of FIGS. 11-12 and other embodiments, the feature/function of generating electrical and/or digital signals for duplicating functions of a video game controller buttons/keys or switches can be assigned by a user to different buttons/keys, switches or other components on a video game accessory. By way of example, a user can assign trigger functions to the buttons or switches on a video game accessory (e.g., a gun grip) to customize how electrical and/or digital signals are generated/triggered by the accessory. The video game accessory may include mechanical, electromechanical or electrical switches that can be used by a user for such customization of signal generation/triggering functions.

Figure 13:
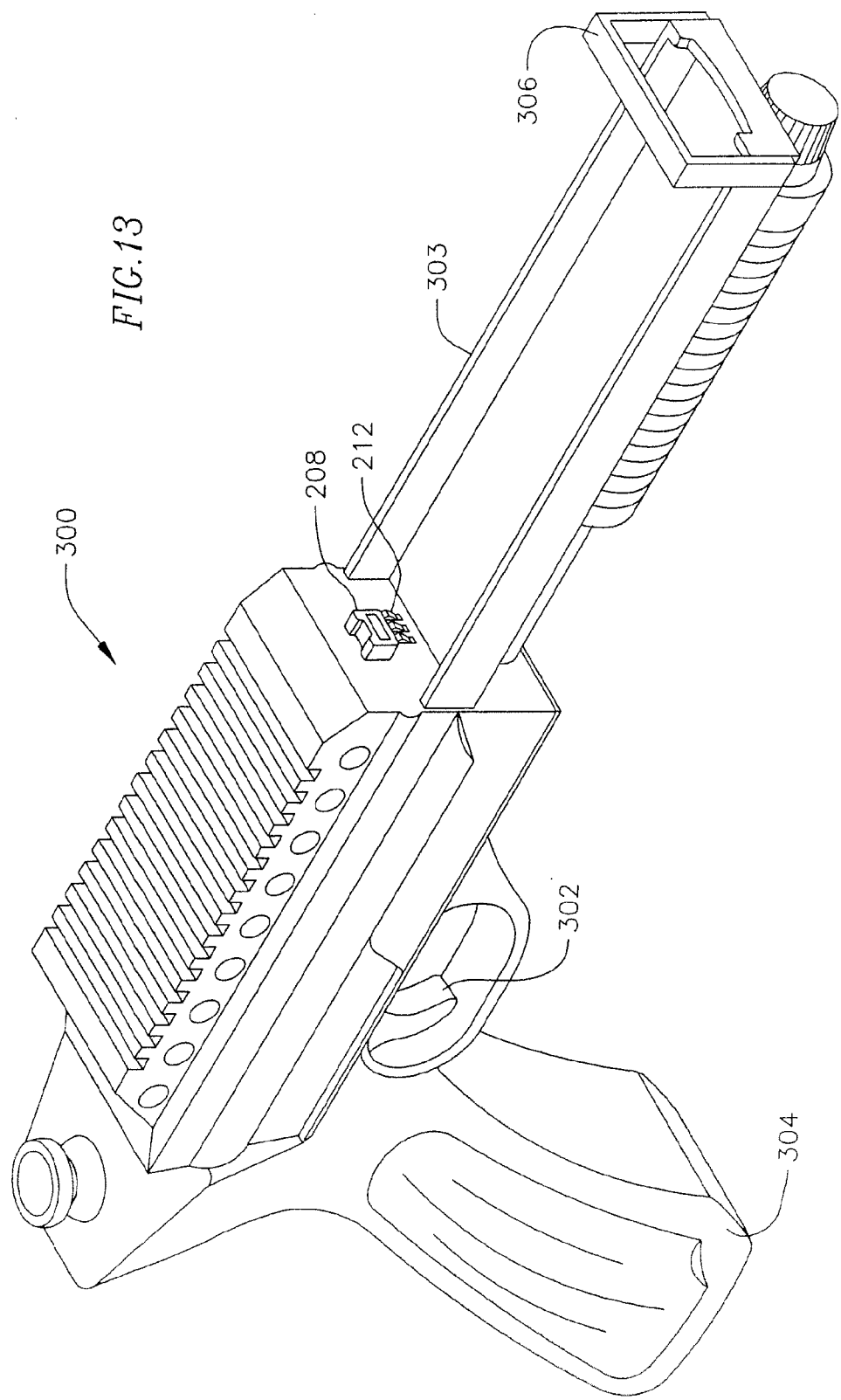
FIG. 13 is a front perspective view of another video game accessory (or video game controller accessory) including a male connector for mating with the female connector on the video game controller of FIG. 9.
Figure 14:
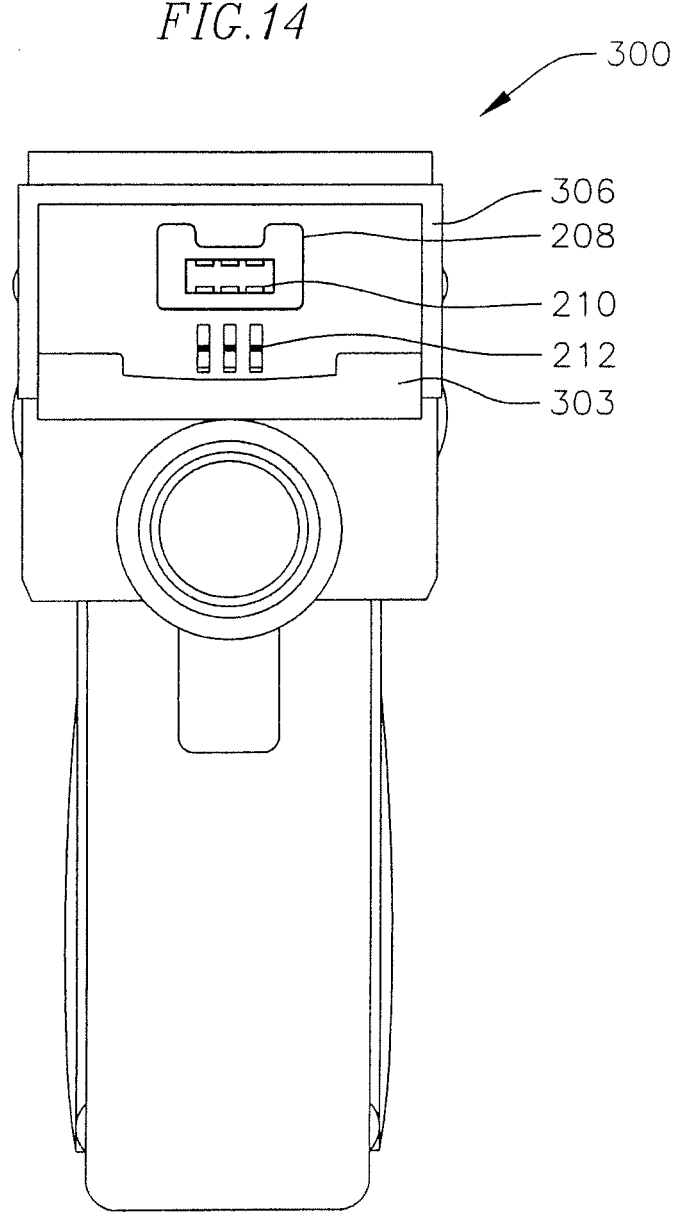
FIG. 14 is a front view of the video game accessory of FIG. 13.

FIG. 13 is a front perspective view of another video game accessory (or video game controller accessory) 300 including a male connector 208 for mating with the female connector 10 on the video game controller 100 of FIG. 9. FIG. 14 is a front view of the video game accessory of FIG. 13. The video game accessory 300 of FIG. 13 is a shot gun grip (a gun controller) for mounting the video game controller 100 thereon. The video game accessory 300 includes a grip 304, a trigger 302 and a controller mount 303. The controller mount 303 is configured to support the video game controller 100, and the grip 304 is configured for a user to grab onto while playing a shooting game, for example. The video game accessory 300 also includes a holding member 306 for engaging and holding the video game controller 100 after it is placed on the controller mount 303. The trigger 302 is configured to be pulled by a user to give a shooting command control signal to the video game controller 100. By way of example, in one embodiment, when the trigger 302 is pulled, the video game accessory 300 sends a control signal corresponding to pressing of the 'B' button 104 on the video game controller 100 to the video game controller 100.

The video game accessory 300 also includes a male connector 208 for physically and electrically coupling to the female connector 10 of the video game controller 100. The male connector 208 has formed thereon a plurality of primary contacts 210 for electrically coupling with the primary contacts 16 of the female connector 10. In one embodiment, three primary contacts 210 are formed at each of both top and bottom inner surfaces of the male connector 208 to electrically couple with the six primary contacts 16 of the female connector 10.

The male connector 208 also includes a plurality of secondary electrical contacts 212. The secondary electrical contacts 212 are spring loaded to press on the secondary contacts 19 of the female connector 10 for sufficient/suitable electrical connection. In one embodiment, the male connector 208 includes three secondary contacts 212 to electrically couple with the three secondary contacts 19 in the video game controller 100 of FIG. 9. In other embodiments, the number of primary and/or secondary contacts may be different to electrically contact the primary and secondary contacts 16, 19 of FIG. 9.

In operation, for example, the primary contacts 210 may receive power, ground and other signals from the video game controller 100 through the primary contacts 16. The secondary contacts 212 are used to transmit control signals to the video game controller 100. For example, the control signals may includes key/button press signals, motor drive signals, data signals, and/or the like. For instance, when the key/button press signals are provided to the video game controller 100, the video game controller 100 may perceive them as a pressing of a corresponding key/button on the video game controller 100. While the video game accessory 300 includes only six primary contacts 210 and the three secondary contacts 212, in other embodiments, the number of primary and/or secondary contacts may be different to correspond to the number of primary/secondary contacts in the corresponding female connector.

Figure 15:
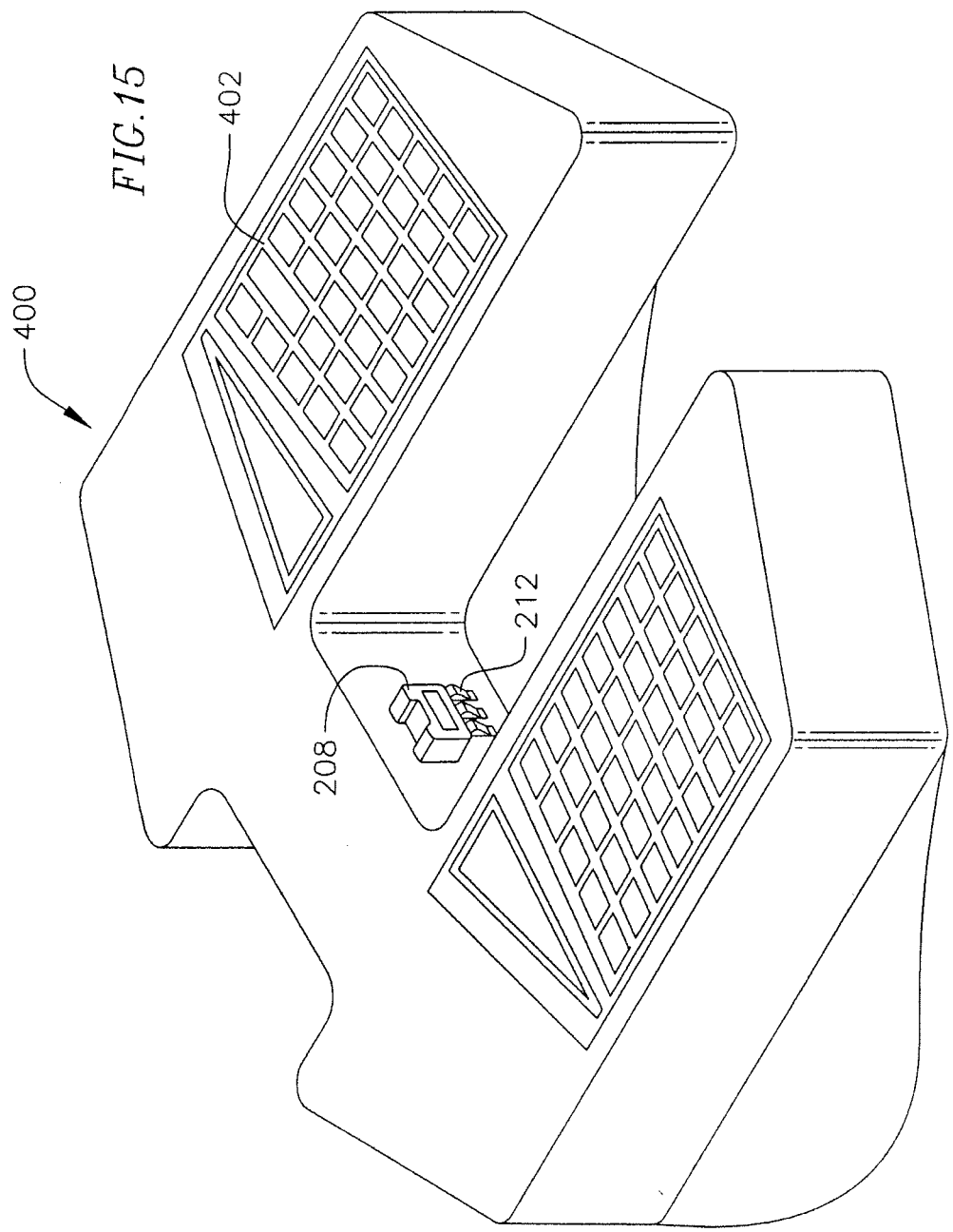
FIG. 15 is a front perspective of a video game accessory of another embodiment according to the present invention.
Figure 16:
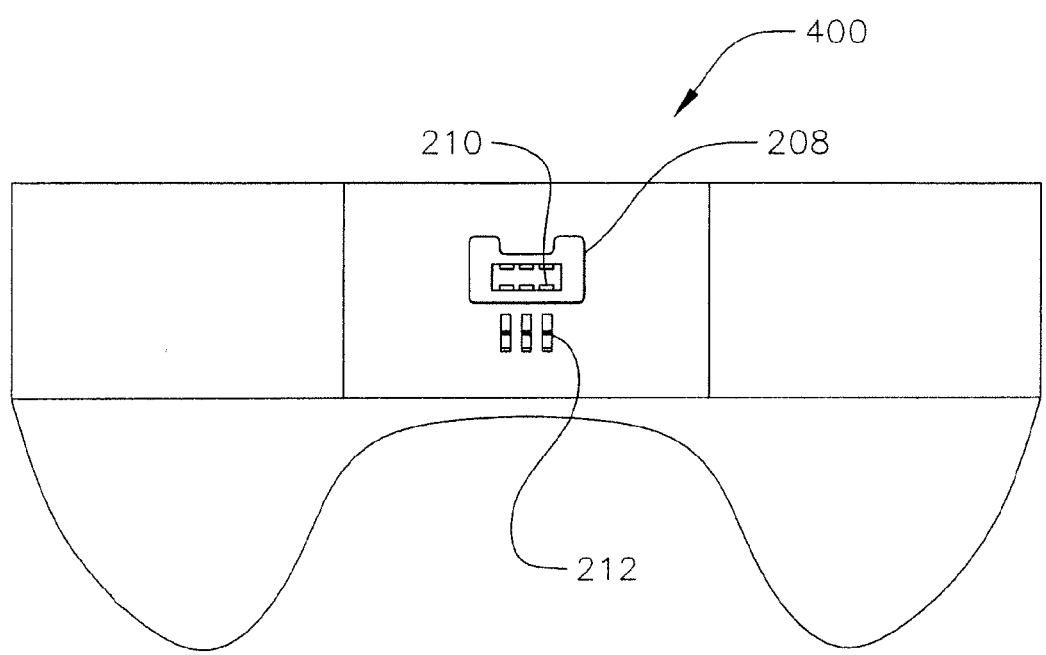
FIG. 16 is a front view of the video game accessory of FIG. 15.

FIG. 15 is a front perspective of a video game accessory 400 of another embodiment according to the present invention. FIG. 16 is a front view of the video game accessory 400 of FIG. 15. The video game accessory 400 of FIG. 15 is a type pad (e.g., keyboard) for mounting the video game controller 100 thereon. The video game accessory 400 includes key pads 402 for entering text, control and commands. The key pads 402, for example, include all of the alphanumeric keys as well as other special keys. For example, the video game accessory 400 may be used for menu selection and/or web browsing using video game controller 100 communicating with a video game console (e.g., Wii, Xbox® 360 or PS3® video game console). By way of example, when the video game controller 100 is a WAND controller, shoulder buttons or other suitable buttons or switches on the video game accessory may be used as buttons replicating 'A' and 'B' buttons 102, 104 on the video game controller 100. In other words, by pressing shoulder buttons on the video game accessory 400, the video game accessory 400 may send control signals (i.e., 'A' or 'B' button press signals) to the video game controller 100.

The video game accessory 400 also includes a male connector 208 for physically and electrically coupling to the female connector 10 of the video game controller 100. The male connector 208 has formed thereon a plurality of primary contacts 210 for electrically coupling with the primary contacts 16 of the female connector 10. In one embodiment, three primary contacts 210 are formed at each of both top and bottom inner surfaces of the male connector 208 to electrically couple with the six primary contacts 16 of the female connector 10.

The male connector 208 also includes a plurality of secondary electrical contacts 212. The electrical contacts 212 are spring loaded to press on the secondary contacts 19 of the female connector 10 for sufficient/suitable electrical connection. In one embodiment, the male connector 208 includes three secondary contacts 212 to electrically couple with the three secondary contacts 19 in the video game controller 100 of FIG. 9. In other embodiments, the number of primary and/or secondary contacts may be different to electrically contact the primary and secondary contacts 16, 19 of FIG. 9.

In operation, for example, the primary contacts 210 may receive power, ground and other signals from the video game controller 100 through the primary contacts 16. The secondary contacts 212 are used to transmit control signals to the video game controller 100. For example, the control signals may includes key/button press signals, motor drive signals, data signals, and/or the like. For instance, when the key/button press signals are provided to the video game controller 100, the video game controller 100 may perceive them as a pressing of a corresponding key/button on the video game controller 100. While the video game accessory 400 includes only six primary contacts 210 and the three secondary contacts 212, in other embodiments, the number of primary and/or secondary contacts may be different to correspond to the number of primary/secondary contacts in the corresponding female connector.

Figure 17:
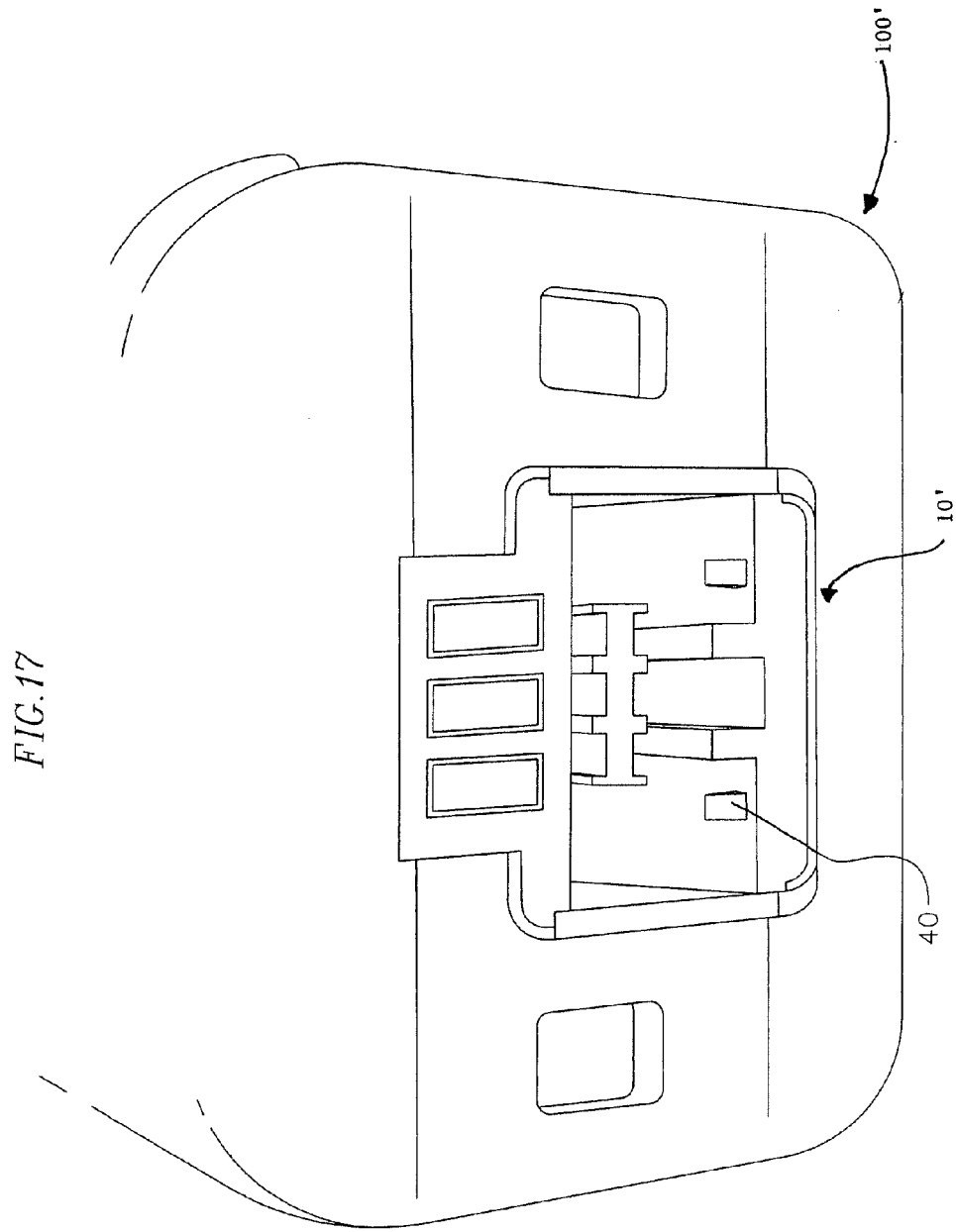
FIG. 17 is a bottom perspective view of a video game controller including a female connector of another embodiment according to the present invention.

FIG. 17 is a bottom perspective view of a video game controller 100' including a female connector 10' of another embodiment according to the present invention. The female connector 10' of the video game controller 100' is substantially the same as the female connector 10 of the video game controller 100, except that the female connector 10' includes a pair of additional contacts (or contact plates) 40 that are used to receive additional control signals from an external device, such as a video game accessory or an auxiliary video game controller. As can be seen in FIG. 17, the additional contacts 40 are formed on an insulated inner surface of the case 11, and may be used to receive control signals for driving a motor (e.g., rumble or vibration signal). The contacts 40 may be formed of suitable conductive metal such as aluminum or copper, for example.

Figure 18:
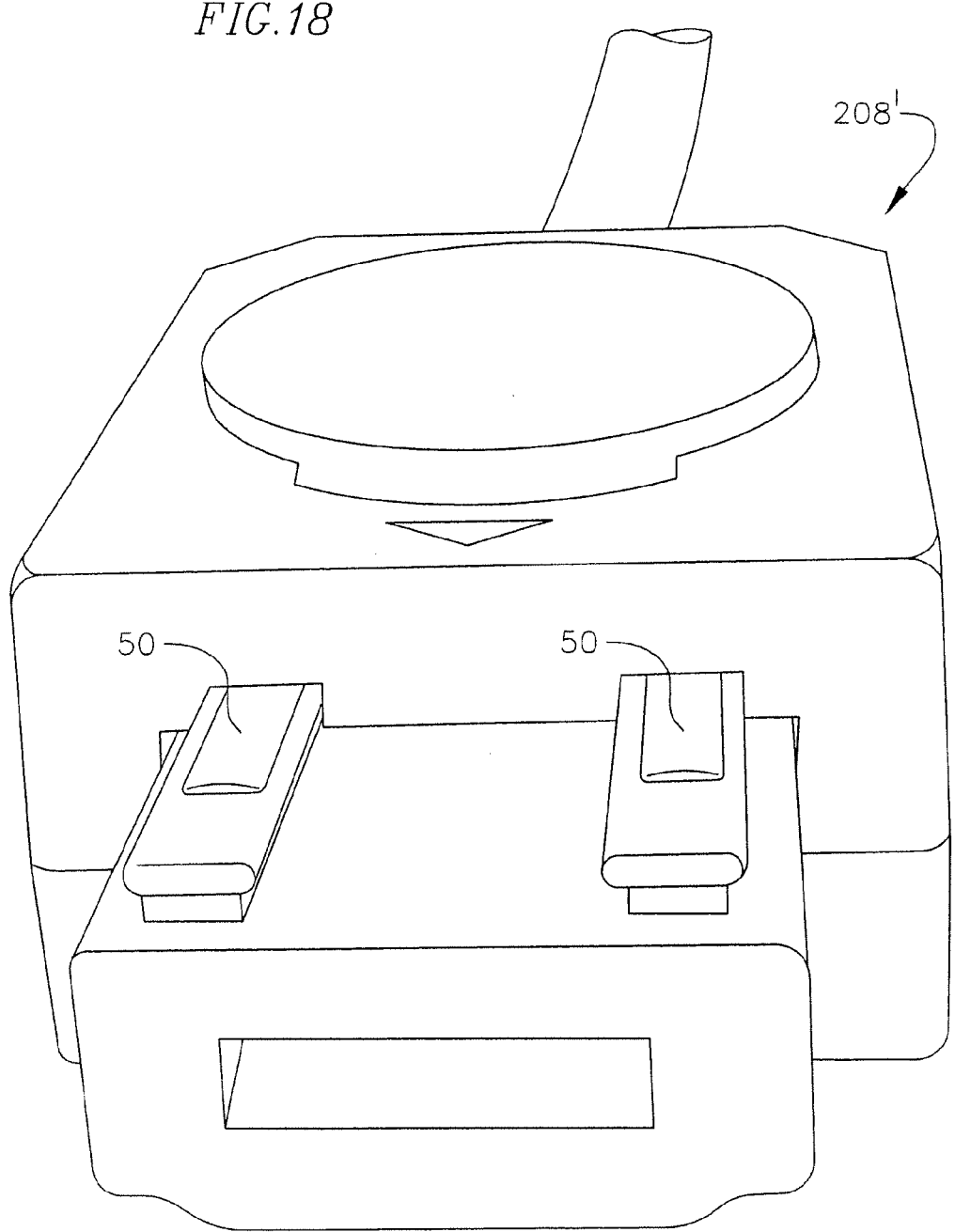
FIG. 18 is a perspective view of a male connector configured to mate with the female connector on the video game controller of FIG. 17.

FIG. 18 is a perspective view of a male connector 208' configured to mate with the female connector 10' on the video game controller 100' of FIG. 17. The male connector 208' has substantially the same configuration as the male connector 208 of FIG. 11, for example, except that it includes additional contacts (or contact plates) 50 for electrically coupling with the contacts 40 to provide control signals to the video game controller 100'. The contacts 50 may be formed of suitable conductive metal such as aluminum or copper, for example.

Figure 19:
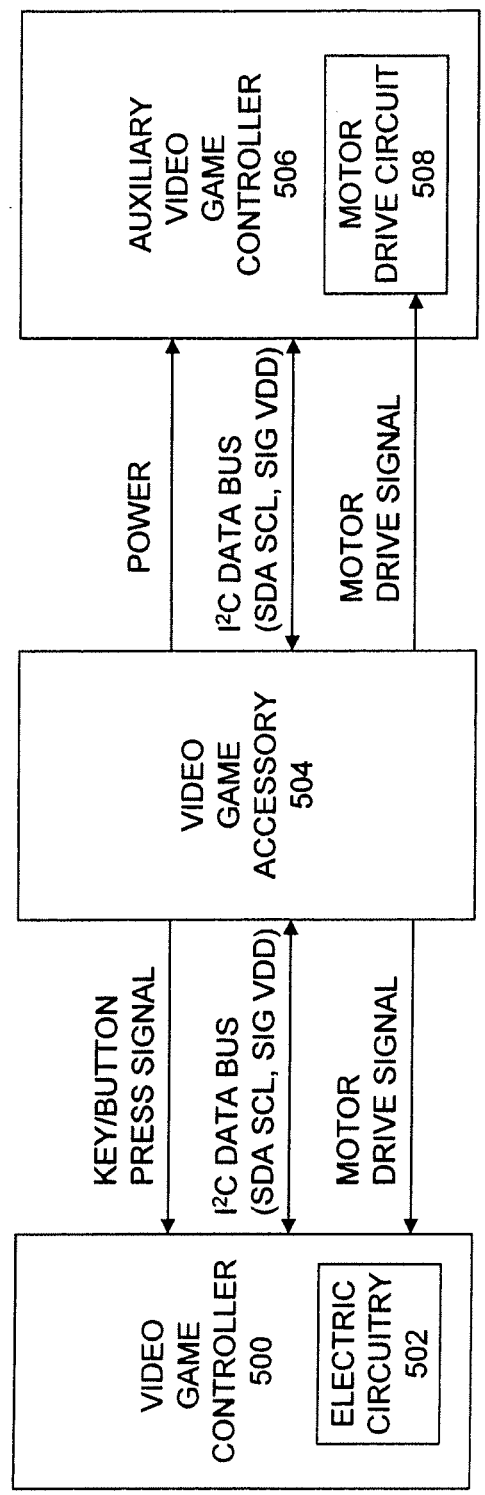
FIG. 19 is a block diagram of a video game accessory coupled to a video game controller and an auxiliary video game controller according to another embodiment of the present invention.

FIG. 19 is a block diagram of a video game accessory 504 coupled to a video game controller 500 and an auxiliary video game controller 506 according to another embodiment of the present invention. The video game accessory 504 may be a pistol grip similar to the video game accessories depicted in FIGS. 11 and 13, but may additionally have a mount support for mounting the auxiliary video game controller 506 in addition to the video game controller 500 that may be substantially similar to the video game controller 100 of FIG. 9.

The video game controller 500 may be substantially similar to the video game controller 100 of FIG. 9, and may be a WAND controller available from Nyko Technologies, Inc. The auxiliary video game controller 506 may be a KAMA controller with rumble available from Nyko Technologies, Inc. In one embodiment, the KAMA controller with rumble is wired; in other embodiments, the KAMA controller with rumble may be configured to communicate wirelessly with the video game controller 500 and/or the video game accessory 504.

The video game accessory 504 provides a key/button press signal, and a motor drive signal to electric circuitry (i.e., electronic circuitry 502) of the video game controller 500. The electrical circuitry 502 may include one or more of a motor for generating vibrations or rumble, a microprocessor or microcontroller for controlling operations of the video game controller 500 including user interface such as converting button press to electrical signals and light indications, a speaker, a microphone, logic circuitry, communication (e.g., wireless communication) circuitry, motion/orientation sensors, memory and/or the like, as those skilled in the art would appreciate.

By way of example, the key/button press signal in one embodiment commands the electric circuitry 502 in the video game controller 500 to initiate operation as though one of the keys/buttons (e.g., 'A' or 'B' key or button) has been pressed. Here, the key/button press signal may be connected in parallel to A and B keys/buttons. In other words, these signals duplicate or simulate the functions of the A and B keys/buttons. Further, the motor drive signal causes the motor in the electric circuitry 502 to operate to generate vibrations. The motor drive signal may originate from the video game controller 500 and may be a synchronizing rumble signal to the video game accessory 504 and the auxiliary video game controller 506. Here, the motor drive signal can be provided to the video game controller 500 by the video game accessory 504, but it is not required. For example, in an exemplary embodiment, the video game accessory 504 (e.g., a gun grip) can have a motor for vibrations that can be operated by activating a switch (e.g., pressing a button or pulling a trigger). The video game accessory 504 can also send a motor drive signal to the video game controller 500 to drive the motor for vibrations in the video game controller 500.

The video game controller 500 and the video game accessory 504 also have an Inter-Integrated Circuit ($I^2C$) data bus interface therebetween in one embodiment. The $I^2C$ data bus has three signal wires for Serial Data (SDA), Serial Clock (SCL) and SIG VDD signals. SDA is a data signal, SCL is synchronization clock, and the SIG VDD is peripheral equipment detect signal. The video game accessory 504 also communicates with the auxiliary video game controller 506 over an $I^2C$ data bus. The video game accessory 504 in one embodiment supplies power (e.g., 3.3V DC power) to the auxiliary video game controller 506 to electrical circuitry therein and to the motor drive circuit 508. The power may originate from the video game controller 500 or from the video game accessory 504. For example, the video game controller 500 may provide power to the video game accessory 504.

Figure 20:
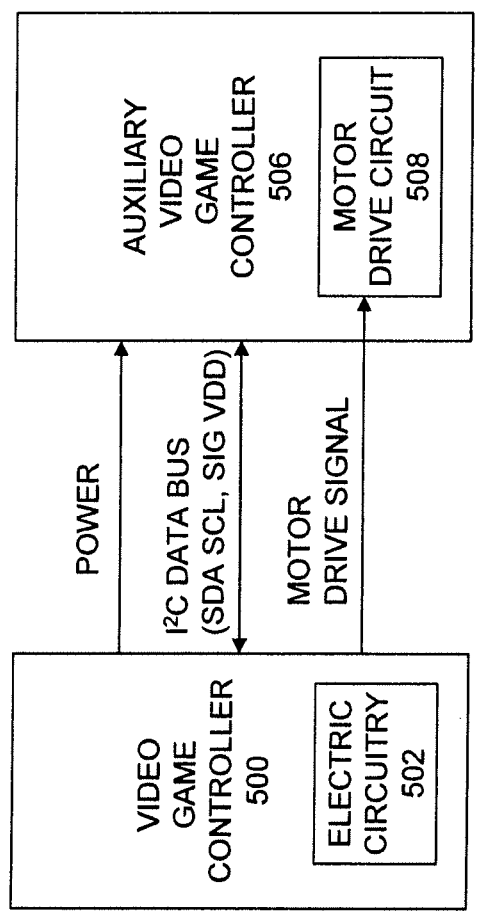
FIG. 20 is a block diagram of a video game controller coupled to an auxiliary video game controller according to another embodiment of the present invention.

FIG. 20 is a block diagram of the video game controller 500 coupled to the auxiliary video game controller 506 according to another embodiment of the present invention. The system depicted in FIG. 20 is substantially similar to the one depicted in FIG. 19, except that the video game controller 500 and the auxiliary video game controller 506 operate together without a video game accessory. The video game controller 500 and the auxiliary video game controller 506 communicate with each other over an $I^2C$ data bus. The video game controller 500 provides power (e.g., 3.3V DC power) to the auxiliary video game controller 506. The video game controller 500 also provides the motor drive signal to the motor drive circuit 508 in the auxiliary video game controller 506.

Figure 21:
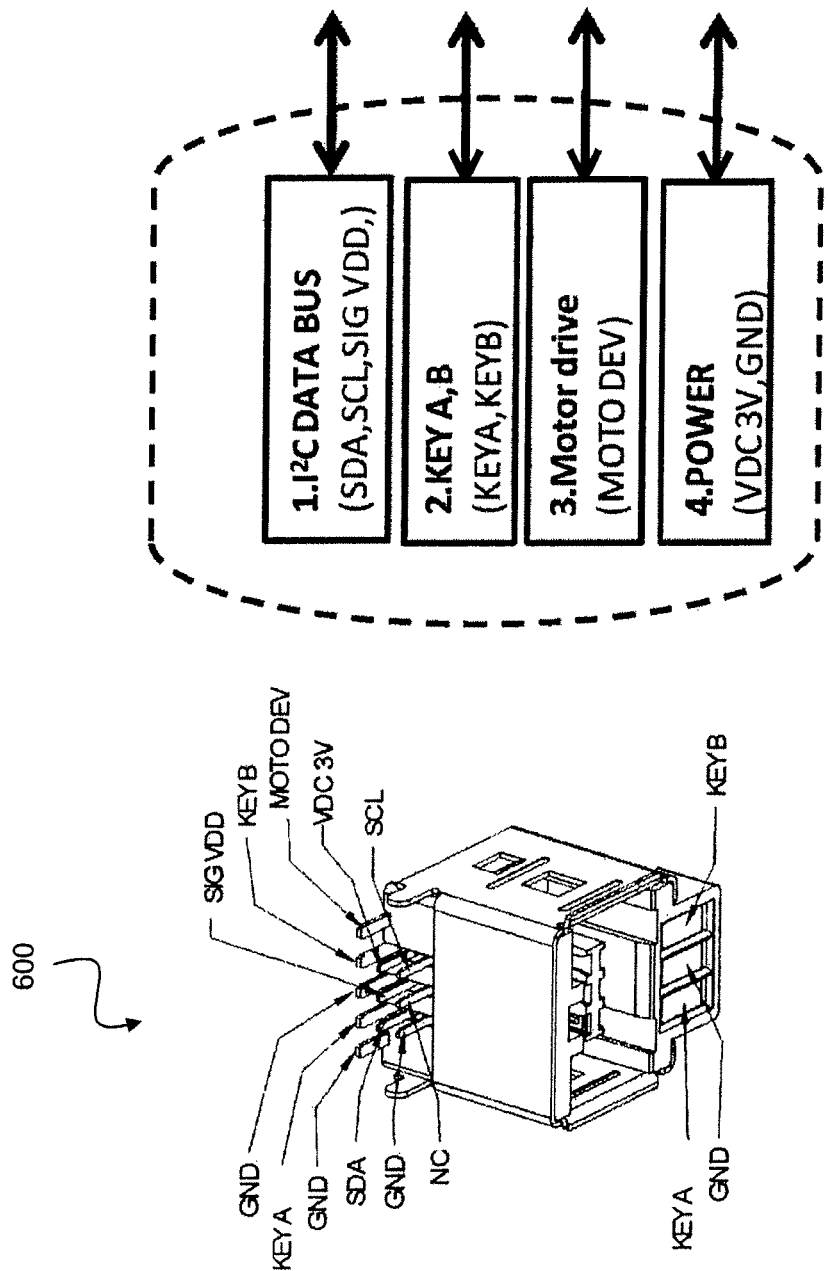
FIG. 21 is a perspective view and signal description of a female connector (or female plug) of a video game controller according to another embodiment of the present invention.

FIG. 21 is a perspective view and signal description of a female connector (or female plug) 600 of a video game controller according to another embodiment of the present invention. The video game controller may be a WAND controller. It can be seen in FIG. 21 that the female connector 600 includes a plurality of pins: 1) GND, 2) KEY A, 3) GND, 4) SDA, 5) GND, 6) NC (not connected), 7) SIG VDD, 8) KEY B, 9) MOTO DEV, 10) VDC 3V and 11) SCL. The VDC 3V and GND pins are for providing power and ground to an external devices (e.g., an auxiliary video game controller). The SDA, SCL and SIG VDD pins are for an $I^2C$ data bus interface, wherein SDA is data signal, SCL is synchronizing clock, and SIG VDD is peripheral equipment detect signal. KEY A and KEY B are for receiving 'A' and 'B' button press signals. The MOTO DEV pin is for providing a motor drive signal. The female connector 600 also includes secondary contacts for KEY A and KEY B signals and GND. The secondary contacts KEY A and KEY B are for receiving button press signals to be transmitted to the respective pins.

In one embodiment, the $I^2C$ data bus interface sends and receives bi-directional signals, the KEY A,B signals are for receiving button press signal input, and the motor drive signal is an output signal. Further, in a particular embodiment, the power of VDC 3V and GND are provided as an output by the video game controller. As indicated by the signal directions (bi-directional arrows) in FIG. 21, however, one or more of the $I^2C$ data bus signals, KEY A,B signals, Motor drive signals and Power can be provided in a single direction and/or bi-directional manner (i.e., can receive and/or transmit over the same contacts or contact plates) in other embodiments, depending on the operation mode and/or configuration of the video game controller and the video game accessory and/or the auxiliary video game controller coupled to the video game controller.

Figure 22:
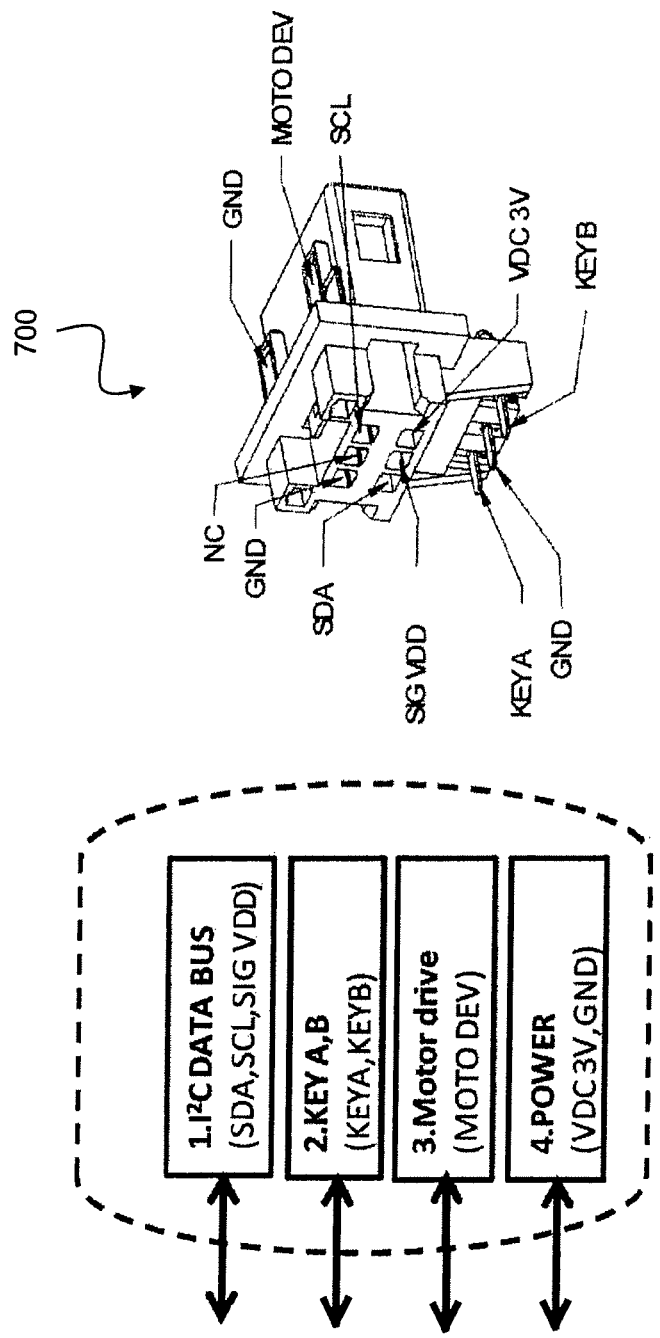
FIG. 22 is a perspective view and signal description of a male connector (or male plug) of a video game accessory according to another embodiment of the present invention.

FIG. 22 is a perspective view and signal description of a male connector (or male plug) 700 of a video game accessory according to another embodiment of the present invention. The video game accessory may be a gun controller or a pistol grip. The male connector 700, for example, may be substantially similar to the male connector 208' of FIG. 20. The male connector 700 has secondary contacts (pins) for outputting KEY A, KEY B and GND signals. The male connector 700 also includes pins SDA, SCL and SIG VDD for an $I^2C$ data bus interface. The male connector 700 also includes GND and VDC 3V contacts for receiving power, and also has a non-connected (NC) pin. The connector 700 also sends out GND and MOTO DEV for sending motor signals. As indicated by the signal directions (bi-directional arrows) in FIG. 22, one or more of the $I^2C$ data bus signals, KEY A,B signals, Motor drive signals and Power can be provided in a single direction and/or bi-directional manner (i.e., can receive and/or transmit over the same contacts or contact plates) in other embodiments, depending on the operation mode and/or configuration of the video game accessory and the video game controller and/or the auxiliary video game controller coupled to the video game accessory.

FIG. 23 is a perspective view and signal description of a male connector (or male plug) of an auxiliary video game controller 800 according to another embodiment of the present invention. The auxiliary video game controller 800 may be a KAMA controller with rumble. The male connector 800, for example, may be substantially similar to the male connector 208' of FIG. 20. The male connector 800 includes pins SDA, SCL and SIG VDD for an $I^2C$ data bus interface. The male connector 800 also includes GND and MOTO DEV for receiving motor drive signals, and also has a non-connected (NC) pin. The male connector 800 receives power and ground from an external device through VDC 3V and GND contacts, respectively. As indicated by the signal directions (bi-directional arrows) in FIG. 23, one or more of the $I^2C$ data bus signals, Motor drive signals and Power can be provided in a single direction and/or bi-directional manner (i.e., can receive and/or transmit over the same contacts or contact plates) in other embodiments, depending on the operation mode and/or configuration of the auxiliary video game controller and the video game controller and/or the video game accessory coupled to the auxiliary video game controller.

While this invention has been described in connection with certain exemplary embodiments, it is to be understood that the invention is not limited to the disclosed embodiments, but, on the contrary, is intended to cover various modifications and equivalent arrangements included within the spirit and scope of the appended claims and their equivalents. The invention (s) of the present application also covers all other embodiments disclosed herein that will be claimed in a non-provisional application as well as any divisional and/or continuation applications.

What is claimed is:

1. A connector of a handheld video game controller, the handheld video game controller for controlling a video game console and comprising electrical circuitry and a plurality of buttons comprising a first button and a second button, the connector being for connecting to a video game accessory and comprising:
a case having a cavity and a contact mount in the cavity;
a protruding member attached to the case;
a plurality of contacts for receiving and transmitting a plurality of electrical signals with the video game accessory, the plurality of contacts comprising primary contacts on the contact mount and secondary contacts on the protruding member; and
a corresponding plurality of pins protruding from a side of the case and electrically coupled to respective ones of the plurality of contacts, the plurality of pins being for communicating the electrical signals with the electrical circuitry of the handheld video game controller,
wherein the secondary contacts comprise a first contact for
receiving a first electrical signal from the video game accessory that corresponds to pressing the first button, from among the plurality of electrical signals, and
transmitting the first electrical signal to the electrical circuitry via a first one of the plurality of pins, the transmitting of the first electrical signal causing the handheld video game controller to send a first command to the video game console as if the first button had been pressed, and
wherein the secondary contacts further comprise a second contact for
receiving a second electrical signal from the video game accessory that corresponds to pressing the second button, from among the plurality of electrical signals, and
transmitting the second electrical signal to the electrical circuitry via a second one of the plurality of pins, the transmitting of the second electrical signal causing the handheld video game controller to send a second command to the video game console as if the second button had been pressed.

2. The connector of claim 1, wherein the plurality of electrical signals comprises at least one of a motor drive signal or a serial data signal.

3. The connector of claim 1, wherein
an insulation is on one of inner surfaces of the case, and
the plurality of contacts comprises additional contacts on the insulation.

4. The connector of claim 3, wherein at least one of the additional contacts is configured to receive a motor drive signal to initiate vibration.

5. The connector of claim 1, wherein the connector is configured to remap one or more buttons, keys, switches, triggers, wheels, and/or sticks of the video game accessory to one or more of the plurality of buttons of the video game controller.

6. A handheld video game controller for controlling a video game console and comprising:
electrical circuitry;
a plurality of buttons comprising a first button and a second button; and
a connector for connecting to a video game accessory and comprising:
a case having a cavity and a contact mount in the cavity;
a protruding member attached to the case;
a plurality of contacts for receiving and transmitting a plurality of electrical signals with the video game accessory, the plurality of contacts comprising primary contacts on the contact mount and secondary contacts on the protruding member; and
a corresponding plurality of pins protruding from a side of the case and electrically coupled to respective ones of the plurality of contacts, the plurality of pins being for communicating the electrical signals with the electrical circuitry,
wherein the secondary contacts comprise a first contact for
receiving a first electrical signal from the video game accessory that corresponds to pressing the first button, from among the plurality of electrical signals, and
transmitting the first electrical signal to the electrical circuitry via a first one of the plurality of pins, the transmitting of the first electrical signal causing the handheld video game controller to send a first command to the video game console as if the first button had been pressed, and
wherein the secondary contacts further comprise a second contact for
receiving a second electrical signal from the video game accessory that corresponds to pressing the second button, from among the plurality of electrical signals, and
transmitting the second electrical signal to the electrical circuitry via a second one of the plurality of pins, the transmitting of the second electrical signal causing the handheld video game controller to send a second command to the video game console as if the second button had been pressed.

7. The video game controller of claim 6, wherein the plurality of electrical signals comprises at least one of a motor drive signal or a serial data signal.

8. The video game controller of claim 6, wherein
an insulation is on one of inner surfaces of the case, and
the plurality of contacts comprises additional contacts on the insulation.

9. The video game controller of claim 8, wherein at least one of the additional contacts is configured to receive a motor drive signal to initiate vibration.

* * * * *